United States Patent [19]
Kennedy

[11] Patent Number: 6,134,582
[45] Date of Patent: Oct. 17, 2000

[54] SYSTEM AND METHOD FOR MANAGING ELECTRONIC MAIL MESSAGES USING A CLIENT-BASED DATABASE

[75] Inventor: Kevin Alan Kennedy, Redmond, Wash.

[73] Assignee: Microsoft Corporation, Redmond, Wash.

[21] Appl. No.: 09/084,597

[22] Filed: May 26, 1998

[51] Int. Cl.[7] .................................................. G06F 17/00
[52] U.S. Cl. .......................... 709/206; 709/203; 709/219
[58] Field of Search .................................. 709/206, 207, 709/219, 203; 379/93.01

[56] References Cited

U.S. PATENT DOCUMENTS

| | | | |
|---|---|---|---|
| 5,632,011 | 5/1997 | Landfield et al. | 709/206 |
| 5,793,972 | 8/1998 | Shane | 709/219 |
| 5,826,022 | 10/1998 | Nielsen | 709/206 |
| 5,893,087 | 4/1999 | Wlaschin et al. | 707/3 |
| 5,928,333 | 7/1999 | Landfield et al. | 709/245 |
| 5,937,162 | 8/1999 | Funk et al. | 709/206 |

OTHER PUBLICATIONS

Levitt, Mark, "POP Goes the E–Mail," Copyright © 1996 International Data Corporation, published Sep. 1996, Document #12210, pp. 1–9.

"What is IMAP?" article found on the World Wide Web at http://www.imap.org/whatisIMAP.html, The IMAP Connection, © 1996 The University of Washington, page 1.

Gray, Terry, "Comparing Two Approaches to Remote Mailbox Access: IMAP vs. POP," article found on the World Wide Web at http://www.imap.org/imap.vs.pop.brief.html, Nov. 5, 1993, pp. 1–4.

Gray, Terry, "Message Access Paradigms and Protocols," article found on the World Wide Web at http://www.i-map.org/imap.vs.pop.html, Aug. 28, 1995, pp. 1–10.

Crispin, M., "Internet Message Access Protocol—Version 4rev1," article found on the World Wide Web at http://www.imap.org/docs/rfc2060.html, Dec. 1996, page 1.

Myers et al., "Post Office Protocol—Version 3," Carnegie Mellon, Dover Beach Consulting, Inc., Nov. 1994, pp. 1–8.

*Primary Examiner*—Zarni Maung
*Assistant Examiner*—Yeshi Gebremeskel
*Attorney, Agent, or Firm*—Jones & Askew, LLP

[57] ABSTRACT

Managing electronic mail messages in a client-server environment. A database, stored at the client, maintains a central archive of message-related information in connection with messages located on the server to support current and future message communication operations between the client and the server. Message-related information is retrieved from the server. Based on the message-related information, a determination is made as to whether the message has been downloaded from the server to the local message store located at the client. In response to determining that the message has not been downloaded, the message is downloaded from the server to the local message store. Data fields in the client-based database are populated with the message-related information, and indications are provided in the client-based database that the message is present on the server and that the message has been downloaded. During subsequent client-server sessions, the database is then consulted for managing, the messages. The database also supports efficient management of messages having multiple message parts i.e., message re-assembly.

37 Claims, 16 Drawing Sheets

FIG.4c
FIG.4d

DATABASE 39 → FIG. 4e

| Session ID (200) | UIDL (205) | Message Size (210) | EID (215) | Date and Time (220) | "On Server" Flag (225) | "Download" Flag (230) | "Delete" Flag (235) | Message Group ID (240) | Message Part No. (245) | Total Parts (250) |
|---|---|---|---|---|---|---|---|---|---|---|
| 1 | abcd | 100 | 1 | 12/1/97 12:00:00 | T | ✓ | | | | |
| 2 | efgh | 50  | 2 | 12/1/97 12:01:00 | T | ✓ | ✓ | | | |
| 3 | ijkl | 150 | 3 | 12/4/97 13:00:00 | T | ✓ | | zcy | 1 | 2 |
| 4 | mnop | 300 | 4 | 12/4/97 13:01:00 | T | ✓ | | zcy | 2 | 2 |
| 5 | qrst | 250 | 5 | 12/4/97 13:02:00 | T | ✓ | | | | |

DATABASE 39 → FIG. 4f

| Session ID (200) | UIDL (205) | Message Size (210) | EID (215) | Date and Time (220) | "On Server" Flag (225) | "Download" Flag (230) | "Delete" Flag (235) | Message Group ID (240) | Message Part No. (245) | Total Parts (250) |
|---|---|---|---|---|---|---|---|---|---|---|
| 1 | abcd | 100 | 1 | 12/1/97 12:00:00 | T | ✓ | | | | |
| 3 | ijkl | 150 | 3 | 12/4/97 13:00:00 | T | ✓ | | zcy | 1 | 2 |
| 4 | mnop | 300 | 4 | 12/4/97 13:01:00 | T | ✓ | | zcy | 2 | 2 |
| 5 | qrst | 250 | 5 | 12/4/97 13:02:00 | T | ✓ | | | | |

FIG.4g

DATABASE 39

| Session ID 200 | UIDL 205 | Message Size 210 | EID 215 | Date and Time 220 | "On Server" Flag 225 | "Download" Flag 230 | "Delete" Flag 235 | Message Group ID 240 | Message Part No. 245 | Total Parts 250 |
|---|---|---|---|---|---|---|---|---|---|---|
| 1 | abcd | 100 | 1 | 12/1/97 12:00:00 | U | √ | | | | |
| 2 | ijkl | 150 | 3 | 12/4/97 13:00:00 | U | √ | | zcy | 1 | 2 |
| 3 | mnop | 300 | 4 | 12/4/97 13:01:00 | U | √ | | zcy | 2 | 2 |
| | qrst | 250 | 5 | 12/4/97 13:02:00 | U | √ | | | | |

FIG.4h

DATABASE 39

| Session ID 200 | UIDL 205 | Message Size 210 | EID 215 | Date and Time 220 | "On Server" Flag 225 | "Download" Flag 230 | "Delete" Flag 235 | Message Group ID 240 | Message Part No. 245 | Total Parts 250 |
|---|---|---|---|---|---|---|---|---|---|---|
| 1 | abcd | 100 | 1 | 12/1/97 12:00:00 | T | √ | | | | |
| 2 | ijkl | 150 | 3 | 12/4/97 13:00:00 | T | √ | | zcy | 1 | 2 |
| 3 | mnop | 300 | 4 | 12/4/97 13:01:00 | T | √ | | zcy | 2 | 2 |
| | qrst | 250 | 5 | 12/4/97 13:02:00 | F | √ | | | | |
| 4 | uvwx | | | | T | | | | | |

DATABASE 39 →

| Session ID | UIDL | Message Size | EID | Date and Time | "On Server" Flag | "Download" Flag | "Delete" Flag | Message Group ID | Message Part No. | Total Parts |
|---|---|---|---|---|---|---|---|---|---|---|
| 1 | abcd | 100 | 1 | 12/1/97 12:00:00 | T | ✓ | ✓ | | | |
| 2 | ijkl | 150 | 3 | 12/4/97 13:00:00 | T | ✓ | | zcy | 1 | 2 |
| 3 | mnop | 300 | 4 | 12/4/97 13:01:00 | T | ✓ | | zcy | 1 | 2 |
| 3 | qrst | 250 | 5 | 12/4/97 13:02:00 | F | ✓ | | | | |
| 4 | uvwx | 180 | 6 | 12/5/97 08:00:00 | T | ✓ | | | | |

FIG. 4i

DATABASE 39 →

| Session ID | UIDL | Message Size | EID | Date and Time | "On Server" Flag | "Download" Flag | "Delete" Flag | Message Group ID | Message Part No. | Total Parts |
|---|---|---|---|---|---|---|---|---|---|---|
| 2 | ijkl | 150 | 3 | 12/4/97 13:00:00 | T | ✓ | | zcy | 1 | 2 |
| 3 | mnop | 300 | 4 | 12/4/97 13:01:00 | T | ✓ | | zcy | 2 | 2 |
| 3 | qrst | 250 | 5 | 12/4/97 13:02:00 | F | ✓ | | | | |
| 4 | uvwx | 180 | 6 | 12/5/97 08:00:00 | T | ✓ | | | | |

FIG. 4j

| Session ID | UIDL | Message Size | EID | Date and Time | "On Server" Flag | "Download" Flag | "Delete" Flag | Message Group ID | Message Part No. | Total Parts |
|---|---|---|---|---|---|---|---|---|---|---|
| 2 | ijkl | 150 | 3 | 12/4/97 13:00:00 | T | ✓ | | zcy | 1 | 2 |
| 3 | mnop | 300 | 4 | 12/4/97 13:01:00 | T | ✓ | | zcy | 2 | 2 |
| 4 | uvwx | 180 | 6 | 12/5/97 08:00:00 | T | ✓ | | | | |

200 205 210 215 220 225 230 235 240 245 250

DATABASE 39

FIG. 4k

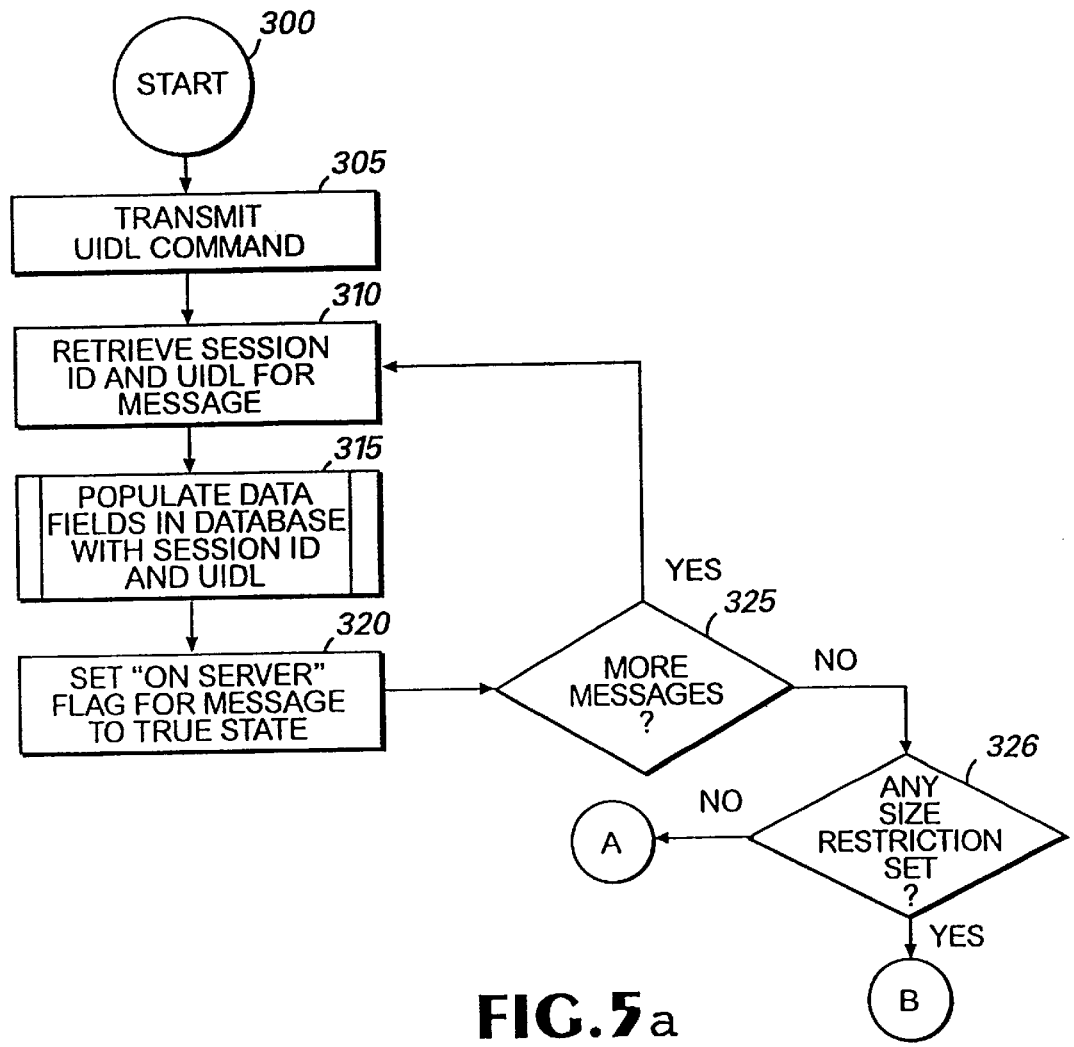
FIG. 5a
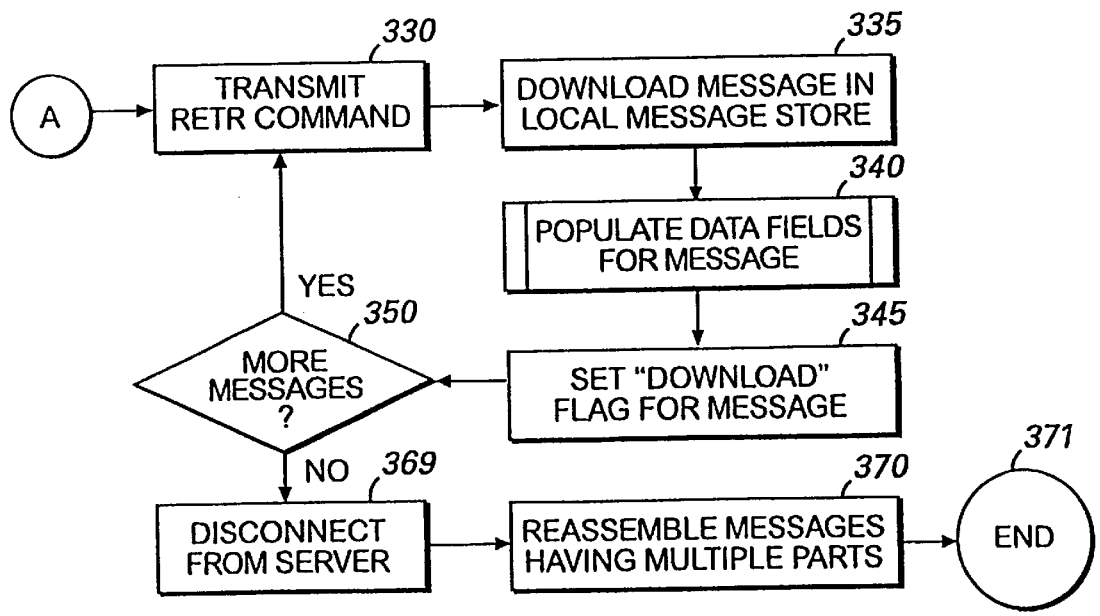
FIG. 5b

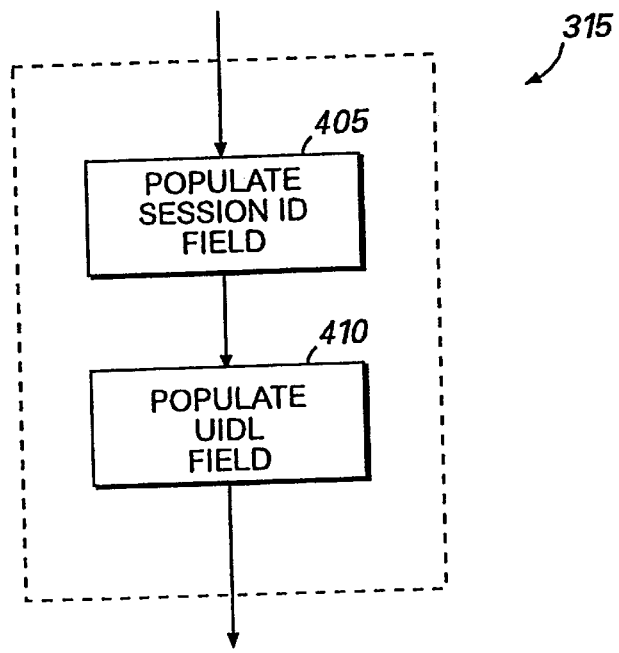
FIG.6a
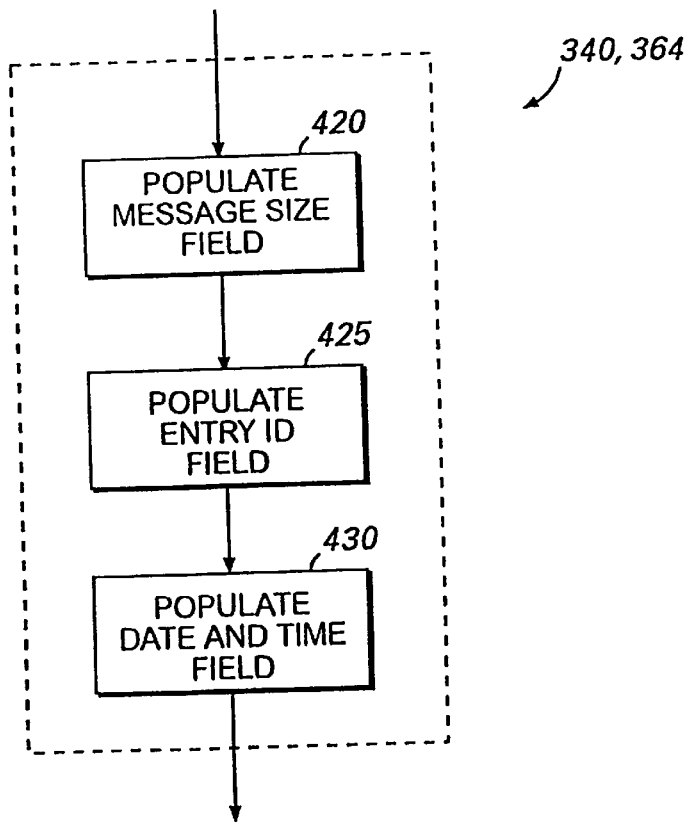
FIG.6b

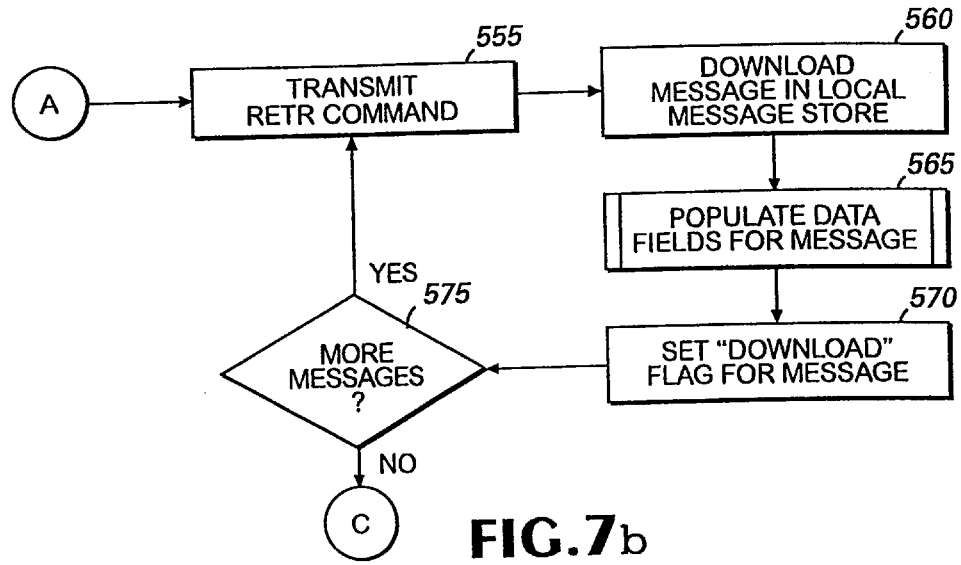
FIG.7b
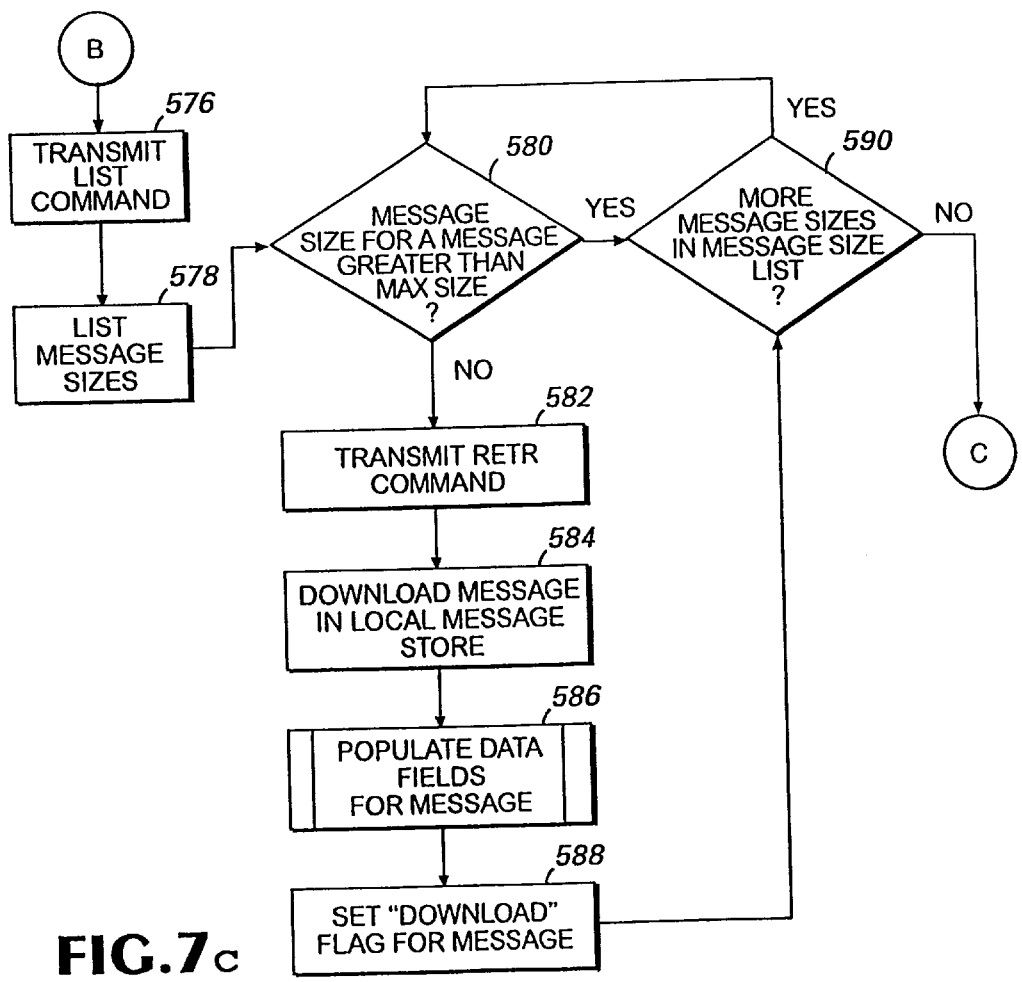
FIG.7c

SYSTEM AND METHOD FOR MANAGING ELECTRONIC MAIL MESSAGES USING A CLIENT-BASED DATABASE

TECHNICAL FIELD

The present invention relates to communication and storage of electronic mail messages, and more particularly relates to a system for managing electronic mail messages using a client-based database.

BACKGROUND OF THE INVENTION

Electronic mail (e-mail) is one of the most commonly used applications for distributed computer networks. The benefits of e-mail applications are obvious. Users can quickly communicate with one another. If a person isn't available to pick up a message immediately, the message is stored until that person can review the stored message at a later time. E-mail messages also provide a quick and easy way to package information such as sales reports, graphics, and other data for transfer to another user by simply attaching the information to the message. These days, business users increasingly rely on e-mail messages to share ideas, transmit documents, schedule meetings, and perform a multitude of other everyday tasks.

These tasks may be accomplished by a variety of software programs. For example, e-mail programs facilitate the transmission of messages between users. Messaging-enabled scheduling programs allow users to request and schedule meetings and appointments via electronic messages. Computer programs known as desktop information managers attempt to coordinate the growing stream of electronic communications by incorporating e-mail, a calendar, task management, contact management, notes, and journal features into a single application program.

The increased reliance on electronic messaging has resulted in a great increase in the number of electronic messages a user sends and receives daily. Users who send and receive a large number of e-mail messages would like an effective way to process their e-mail without spending a lot of time sorting through their in-box, deleting, filing, forwarding, and responding to their messages. Hence, a major problem with e-mail is that a user can become inundated with messages without an efficient and effective means to manage them.

Specifically, mail boxes require management to dispose of messages or to archive those that might be required later. Prior electronic message systems have managed message operations by obtaining required message-related information from the message server or by scanning messages maintained in the local message store at the client. These systems typically contain inefficient code in the messaging protocol implementation, which results in unnecessary retrieval of information from the server. In addition, these systems do not have an efficient means for downloading information and deleting unnecessary information.

For example, the Internet Message Access Protocol (IMAP) and version 3.0 of the Post Office Protocol (POP3) are messaging protocols that supports e-mail messages. IMAP defines a method of accessing electronic mail or bulletin board messages that are kept in a message store on a remote mail server. IMAP permits an e-mail client program to access remote message stores as if they were local. Messages stored on an IMAP server can be easily manipulated by a user who uses multiple computers (e.g., a workstation at the office and a notebook on the road) without requiring the user to transfer messages or files back and forth between his or her computers. POP3 does not have as much flexibility as IMAP. Specifically, POP3 typically requires the deletion of messages from the server after downloading these messages to a client. So, the user is unable to maintain messages on the server if the user so desires. In addition, electronic message programs implementing the POP3 and IMAP protocols typically contain inefficient code requiring commands, such as LIST and POP3 STAT, to be sent for messages already downloaded in a local message store at a client.

In prior systems, multiple part messages are assembled in response to scanning the local message store on the client to obtain information required to combine message parts. To assemble a message comprising multiple message parts, prior message systems have examined contents of a local store to locate message parts. These prior message systems assemble the complete message based on the identified message parts. Typically, these message parts are identified by searching the TO:/FROM: fields of messages and a Message Part Number (message 2 of 5) to locate the available sections of a particular message. Searching the local message store, however, is at best an inefficient processing operation because selected fields of all messages in the message store must be reviewed to locate all available message parts at the client. Although the search of the local message store is focused upon a limited set of required information, all messages in the local message store must be "touched" by this searching operation.

Therefore, there is a need for a system that optimizes communication with electronic message servers. There is also a need for a single mechanism for managing messages in a local message store located at a client. In addition, there is a need for a system that efficiently obtains electronic message-related information from a server. There is a further need for a system that reassembles messages without the need for reviewing each message in a local message store.

SUMMARY OF THE INVENTION

The present invention satisfies the above-described needs by providing a system for managing messages in a client-server environment. The present invention efficiently manages messages and optimizes communication between a client and a server by using a database, stored at the client, to maintain a central archive of message-related information in connection with messages located on the server to support current and future message communication operations between the client and the server.

Generally described, the present invention operates in a distributed computer environment, which includes a server and a client including a local message store and a client-based database. The present invention provides a method for managing electronic mail messages based on message-related information stored in a client-based database. During a client-server session, the message-related information corresponding to the message is retrieved from the server. Based on the message-related information, a determination is made as to whether the message has been downloaded from the server to the local message store located at the client. In response to determining that the message has not been downloaded, the message is downloaded from the server to the local message store located at the client. In addition, data fields in the client-based database are populated with the message-related information, and indications are provided in the database that the message is present on the server and that the message has been downloaded from the server to the local message store. The foregoing steps are then repeated for each remaining message on the server. During subsequent client-server sessions, the database is then consulted for managing the messages.

Typically, the step of downloading the message from the server to the client-based local message store can include determining whether a size restriction has been set for downloading the message. If there is a size restriction, another determination is made as to whether a message size for the message is greater than a predetermined size limit. In response to determining that either 1) a size restriction has not been set for downloading the message or 2) the message size for the message is not greater than the predetermined size limit, the message may then be downloaded from the server to the local message store.

In addition in response to determining that the message has been downloaded from the server to the local message store, the message-related information corresponding to the message may be identified in the client-based database and an indication is generally provided in that database that the message is present on the server.

The message-related information generally includes a unique identifier for identifying the message and a session identifier for indicating the order in which the message is downloaded from the server to the client. The message-related information may also include a message size and a date and time for the message.

For each entry in the client-based database, the data fields Can include a unique identification field for storing the unique identifier, a session identification field for storing the session identifiers a message size field for storing the message size, and a date and time field for storing the date and time. The message-related information obtained from the server can be placed in the respective data fields.

In response to populating the unique identifier and the session identifier in their appropriate data fields in the client-based database, an "on server" flag can be set to a true state in the database to indicate that the message is on the server. In addition, in response to downloading the message from the server to the local message store, a "download" flag can be set in the database to indicate that the message has been downloaded. Before each subsequent client-server session, the session identifiers are usually cleared and the "on server" flag is generally changed from the true state to an unknown state, where the unknown state indicates that the presence of the message on the server is unknown. Finally, during each subsequent client-server session the "on server" flag can be changed from the unknown state to a false state when the message associated with the message-related information is not present on the server. As a result, an indication is provided in the client-based database to delete the message, and the message-related information for the message is removed from the database after each subsequent client-server session is discontinued.

In another aspect, the present invention provides a method for removing from the client-based database message entries for electronic mail messages based on message-related information stored in the database. The client-based database comprises at least one message entry containing message-related information corresponding to one of the selected messages. A determination is made as to whether the client is in a "leave on server" mode, where the "leave on server" mode indicates that the selected message remains on the server after the selected message has been downloaded from the server to the local message store located at the client. If a determination is made that the client is not in the "leave on server" mode, an indication is provided in the corresponding message entry in the database to remove the selected message. For example, a "delete" flag can be set to indicate that the selected message is to be removed. If a determination is made that the client is in the "leave on server" mode, another determination is made as to whether at time expiration has been set for removing the selected message. In response to determining that a time expiration has been set for removing the selected message, a further determination is made as to whether the time has expired for the selected message. Generally, to determine whether the time has expired for a message, a date and time for the message is compared to a preset period of time allowed for the corresponding message entry to remain in the client-based database. In response to determining that the time has expired for the selected message, an indication is provided in the corresponding message entry in the database to remove the selected message. Finally, the corresponding message entry for the selected message is removed from the client-based database and the selected message is removed from the server.

In another aspect, the present invention provides a method for assembling a message at a client, where the message has multiple message parts in a local message store located at the client. In connection with this aspect of the present invention, a corresponding message entry for each of the message parts is stored in a client-based database. Each corresponding message entry includes a message group identifier to identify each part of the message, a message part number to identify the order of the message parts, and a total parts number to indicate the number of parts in the message. Each message entry having the same message group identifier is identified in the database. The message parts having the same message group identifier are selected from the local message store based on the identified message entries in the database. The message parts can then be assembled at the client in order based on the message part number for each of the corresponding message entries in the database.

Advantageously, the present invention provides a system that optimizes communication with electronic message servers by using a client-database to maintain a central archive of message-related information. The present invention provides a single mechanism for managing messages on a client's local message store by accessing archived information in the client-based database during typical message communications operations. In addition, the present invention efficiently reassembles messages without the need for reviewing each message in a local message store by including in the database data fields corresponding to selected fields of a MIME-compatible message to support the assembly of message parts.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIGS. 4a, 4b, 4c, 4d, 4e, 4f, 4g, 4h, 4i, 4j, and 4k, collectively referred to as FIGS. 4a–4k, are diagrams illustrating a message manager database for archiving messages in accordance with an exemplary embodiment of the present invention.

FIGS. 5a, 5b, and 5c are flow diagrams illustrating an exemplary process for an initial download operation utilizing a database in accordance with an exemplary embodiment of the present invention.

FIGS. 6a and 6b are flow diagrams illustrating an exemplary process of populating data fields within a database.

FIGS. 7a, 7b, 7c, and 7d are flow diagrams illustrating an exemplary process of downloading and deleting information subsequent to an initial download operation in accordance with an exemplary embodiment of the present invention.

DETAILED DESCRIPTION

Figure 1:
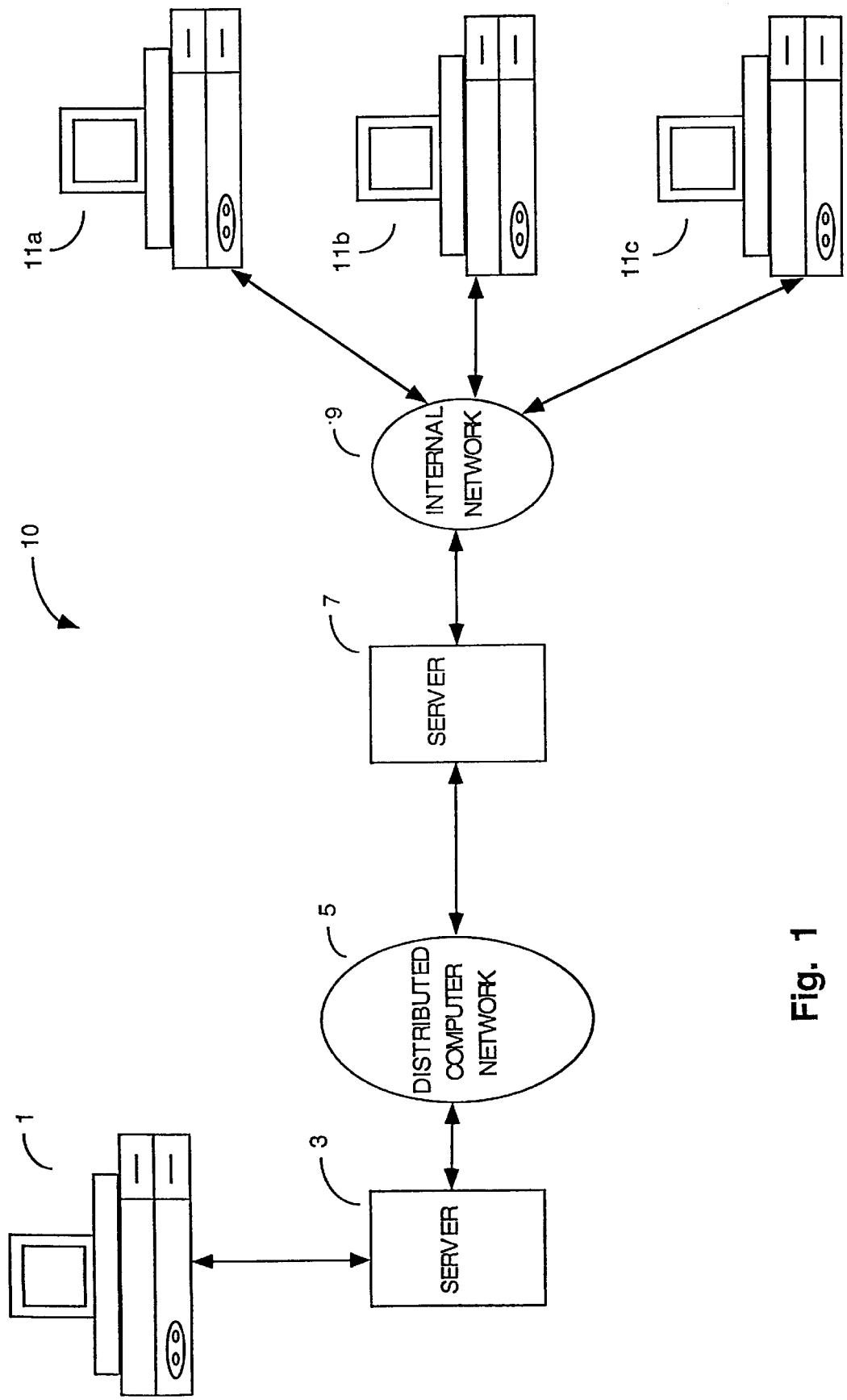
FIG. 1 is a block diagram of a client-server operating environment for an exemplary embodiment of the present invention.

The present invention provides a system for managing messages communicated within a client-server architecture, such as a distributed computing environment represented by a client and a server. In an exemplary embodiment, the invention is incorporated into the "MICROSOFT OUTLOOK '98" application program, which is produced and distributed by Microsoft Corporation of Redmond, Washington. The "MICROSOFT OUTLOOK '98" application program manages e-mail calendars, contacts, tasks and to-do lists, and documents or files on a hard drive. The present invention, namely a message manager program module ("message manager"), uses a database, stored at the client, to maintain a central archive of message-related information to support current and future message communication operations between the client and the server.

In the present invention, communications with a message server are facilitated by accessing a client-based database representing a central archive of message-related information. The present invention accesses archived information in the client-based database during typical message communications operations, such as message download and delete operations. The client-based database is also used to support efficient management of messages having multiple message parts, i.e., message re-assembly. The database of the present invention includes data fields corresponding to selected fields of a MIME-compatible message to support the assembly of message parts.

Referring now to the drawings, in which like numerals represent like elements throughout the several figures, aspects of the present invention and an exemplary operating environment will be described.

EXEMPLARY OPERATING ENVIRONMENT

The following discussion is intended to provide a general description of a suitable computing, environment in which the invention may be implemented. While the invention will be described in the general context of an application program that runs on an operating system in conjunction with a personal computer and in connection with a server, those skilled in the art will recognize that the invention also may be implemented in combination with other program modules. Generally, program modules include routines, operating systems, application programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet.

the Internet, which is a global web of interconnected computers and computer networks, integrates local area networks (LANS) located in various entities, such as businesses, libraries, federal agencies, institutes of learning, and research organizations into a single communication network. The Internet uses a common communication protocol suite, known as a Transmission Control Protocol/Internet Protocol (TCP/IP), which was specifically designed for the interconnection of different computer systems. Internal and external networks are linked by routers that route data packets from a sending network to another router or a receiving network. Gateways handle data transfer and conversion of messages from a sending network to the protocols used by a receiving network. Typically, gateways refer to devices that translate between applications. For example, e-mail gateways translate messages from one vendor's messaging program to another vendor's messaging program so that users with different e-mail programs can share messages over a network.

The Internet uses a message standard, known as a Simple Mail Transfer Protocol (SMTP), which works in conjunction with a user's e-mail program and defines the control messages used by two computers to exchange e-mail messages. Such controls include verification of proper connection, identification of sender, negotiation of transmission parameters, and message transmission. SMTP is responsible for 1) sending mail created by a local user to another computer and 2) receiving mail from other computers on the network and transferring it to the local user's e-mail program.

Typically, the computers connected to a wide area network such as the Internet are identified as either servers or clients. A server is at computer that stores files that are available to the other computers connected to the network. For example, an e-mail server manages message traffic and mail boxes for users, in addition to translation facilities or gateways that allow message exchange between different types of e-mail programs. A client is a computer connected to the network that accesses shared resources provided by a server. To obtain information from a server, a client makes a request for a file or information located on the server using a specified protocol. Upon reception of a properly formatted request, the server downloads the file or information to a local message store located at the client.

FIG. 1 illustrates a typical client-server environment 10 in which the present invention operates. A computer system or client 1, such as a conventional personal computer or any device operable to communicate over a network, is connected to an Internet server computer 3 ("server"). The server 3 is generally provided by an Internet service provider (ISP), which provides Internet access. The server 3 is connected to a distributed computer network 5, such as the Internet, and enables the client 1 to communicate via the distributed computer network 5.

The client 1 communicates via the combination of the server 3 and the distributed computer network 5 to a server 7, such as a communication or an e-mail server. In an exemplary embodiment, servers 3 and 7 support e-mail services, contain a message store for holding messages until delivery, and contain a translation facility or gateway for allowing users having different e-mail programs to exchange mail. The server 7 is connected to an internal network 9 and enables the client 1 to communicate with the clients 11a, 11b, and 11c via the internal network 9.

The clients 11a, 11b, and 11c are not only able to respond to a communication from the client 1, but are also able to initiate communication with the client 1. The clients 11a, 11b, and 11c can send information via the internal network 9 to the server 7. The server 7, in turn, forwards the information to the client 1 via the distributed computer network 5. The information is retrieved by the server 3 and can be forwarded to the client 1, when requested by the client 1.

Figure 2:
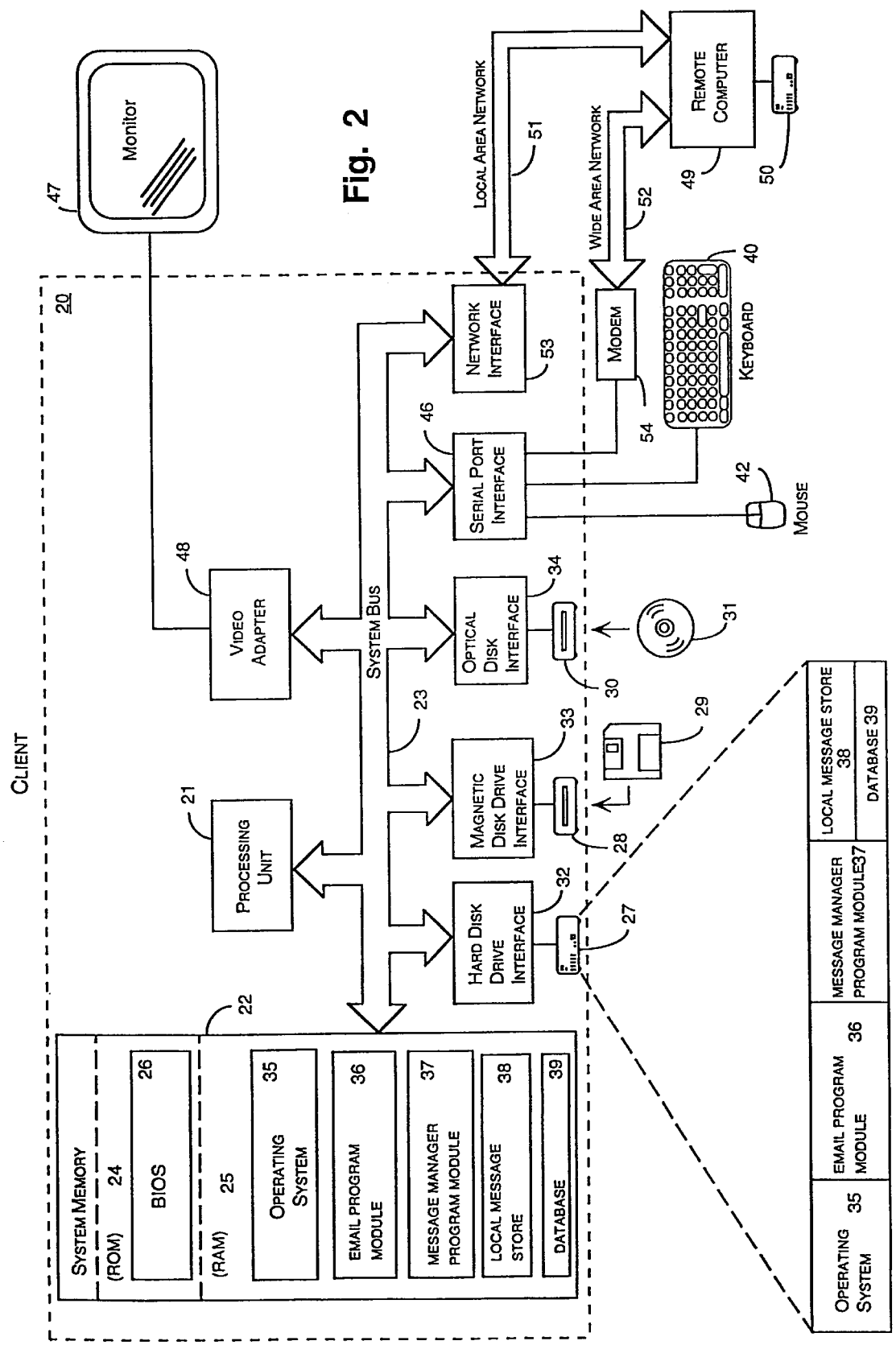
FIG. 2 is a block diagram of an exemplary client system for implementing the present invention.

With reference to FIG. 2, an exemplary system for implementing the invention includes a conventional personal computer 20, which serves as a client. The client 20 may represent any or all of the clients 11a, 11b, and 11c illustrated in FIG. 1. The client 20 includes a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the client 20, such as durinL, START-up, is stored in ROM 24. The client 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by at hard disk drive interface 32, a magnetic disk drive interface 33, and an optical drive interface 34, respectively. The drives and their associated computer-readable media provide nonvolatile storage for the client 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs, such as an e-mail program module 36, other program modules, such as a message manager program module 37, a local message store 38, and a database 39 for supporting e-mail applications. A user may enter commands and information into the client 20 through a keyboard 40 and pointing device, such as a mouse 42. Other input devices (not shown) may include a pen, touch-operated device, microphone joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The client 20 operates typically in a networked environment using logical connections to one or more remote computers, such as a remote computer 49. The remote computer 49 may be an e-mail server (which includes one or more message stores), as described above in connection with FIG. 1, a file server (which includes one or more file stores), a router, a peer device or other common network node, and typically includes many or all of the elements described relative to the client 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment the client 20 is connected to the LAN 51 through a network interface 53. When used in a WAN networking environment, the client 20 typically includes a modem 54 or other means for establishing communications over the WAN 52, such as the Internet. The modern 54, which may be internal or external, is connected to the system bus 23 via the serial port interface 46. In a networked environment, program modules depicted relative to the client 20. or portions thereof, may be stored in the remote memory storage device. It will be appreciated that the network connections shown are exemplary and other means of establishing a communications link between the computers may be used.

Figure 3:
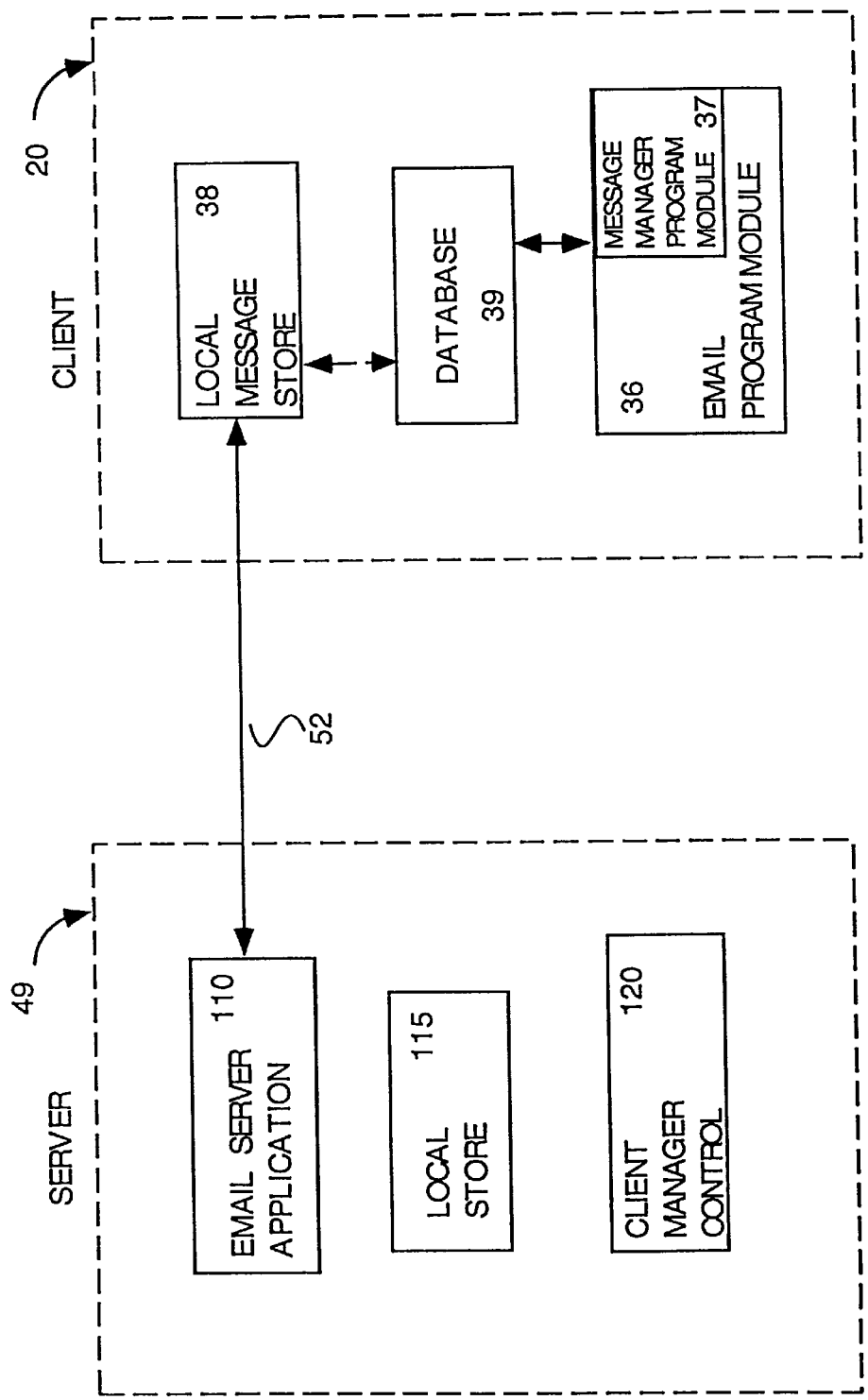
FIG. 3 is a block diagram illustrating inter-operation of a client and server in accordance with an exemplary embodiment of the present invention.

With continuing reference to FIGS. 1 and 2, FIG. 3 is a diagram illustrating inter-operation of a client and server in accordance with an exemplary embodiment of the present invention. This exemplary embodiment is embodied in the "MICROSOFT OUTLOOK '98" application program, which is published by Microsoft Corporation of Redmond, Washington. The program helps users communicate through e-mail, phone support and group scheduling capabilities, and allows users to create and view information using a consistent interface. The "MICROSOFT OUTLOOK '98" program supports an exemplary program module, namely a message manager program module 37, for managing messages. The "MICROSOFT OUTLOOK '98" program also supports various Internet protocols, including, but not limited to protocols known in the art such as Internet Message Access Protocol (IMAP), version 3.0 of Post Office Protocol (POP3), Simple Mail Transfer Protocol (SMTP), Multipurpose Internet Mail Extensions (MIME), and Hyper Text Markup Language (HTML).

In FIG. 3, a remote computer 49 operates as a server and generally includes an e-mail server application 110, a local store 115, and a client manager control 120. In an exemplary embodiment, the server 49 is a POP3 mail server, but it will be appreciated that the present invention is not limited to this type server. In the exemplary embodiment, the client 20 includes a local message store 38, a database 39, an e-mail program module 36, and a message manager program module 37 for facilitating message management and operation of the database 39.

With respect to the exemplary embodiment, the client 20 provides two modes of operation in connection with the server 49. These modes are a default mode and a "leave on server" mode. In the default mode, the client 20 sends a delete command to the server 49 to delete a message from the server 49 after the message has been downloaded to the client 20. In the "leave on server" mode, the client does not send a delete command to the server 49 after the message has been downloaded to the client 20, thereby allowing the message to remain on the server 49 although the message has been downloaded. The mode of operation generally is selected based on user-preference. Advantageously, the present invention optimizes the management of messages when the client 20 is in the "leave on server" mode, as will be described below in connection with FIGS. 4–8.

The server 49 houses any e-mail messages from clients in the local store 115 while awaiting transmission to an appropriate destination. The e-mail server application 110 forwards messages over the WAN 52 from a sender client (not shown) to the client 20, upon request by the client 20. The client manager control 120 is a program used to set up computer systems, such as clients 1, 11*a*, 11*b*, 11*c* (FIG. 1), and 20 (FIG. 2) on the network. The client manager control 120 can also specify the addresses of the computer systems located on the network. In addition, the client manager control 120 typically facilitates the management of incoming and outgoing messages on the server. When a request for a message is made by the client 20 to the server 49, the e-mail server application 110 on the server 49 responds by retrieving the message from the local store 115 on the server 49 and by transmitting the message over the WAN 52 to the client 20. The message is then downloaded into the local message store 38 located at the client 20. The local message store 38 houses all downloaded messages from the server 49.

During the download operation, data fields are populated within the database 39 with message-related information associated with the downloaded message. The information includes a unique identifier for identifying the message, a session identifier for indicating the particular order in which the message is retrieved from the server, a message size and other message-related information that will be described in greater detail herein below with respect to FIGS. 4–8. The e-mail program module 36 provides facilities for creating, addressing, sending, receiving, and forwarding messages, while the message manager program module 37 manages messages during download and deletion operations utilizing the database 39. The use of the database 39 is described in greater detail in connection with FIGS. 4*a*–4*k*, collectively described as FIG. 4.

With continuing reference to FIGS. 1–3 and now turning to FIGS. 4*a*–4*k*, a client-based database used in connection with the exemplary program module 37 is illustrated. FIGS. 4*a*–4*k* illustrate a client-based database for archiving messages in accordance with an exemplary embodiment of the present invention.

The database 39 can include multiple data fields, organized within an array structure, for maintaining message-related information. To support download and delete operations, typical data fields of the database include: a session identifier (session ID) 200, a unique identifier (UIDL) 205, a message size 210, an entry identifier (EID) 215, a receive date and time 220, which is the local machine time, an "on server" flag 225, a "download" flag 230, and a "delete" flag 235. Message re-assembly operations can be supported by adding to the database structure certain data fields corresponding to portions of a MIME-compatible message, such as a message group identifier (message group ID) 240, a message part number 245, and a total parts number 250.

Operation of the database 39 in connection with the message manager program module 37 (FIG. 3) is presented by way of a representative example. In this example, a connection is made between a client 20 (FIG. 3) and server 49 (FIG. 3). A user desires to check her e-mail messages for the first time and is typically prompted by the e-mail program module 36 (FIG. 3) to enter a password for access to the e-mail messages.

Referring to FIG. 4*a*, the server 49 contains two messages in its local store 115. In an initial download operation, the client 20 transmits a UIDL command to the server 49. The UIDL command is a request for identification information associated with a message. Each message has its own unique identifier or UIDL to identify the message. It will be appreciated by one skilled in the art that the present invention is not limited to transmitting a UIDL command to the server to obtain identification information associated with a message, but may instead transmit other commands, such as a TOP command or a LIST command, to obtain such identification information. Furthermore, it will be appreciated that the present invention is not limited to transmitting only one command, such as a UIDL command, to obtain identification information, but may transmit thereafter, other commands, such as a TOP command or a LIST command, if the server fails to respond to the initial UIDL command for obtaining such information.

In response to the UIDL command, the client 20 retrieves from the server a session ID and the requested UIDL for the first message on the server. The session ID is indicative of the particular order in which the message is retrieved from the server during a specific download operation. In this example, the client retrieves session ID "1" and UIDL "abcd" for the first message. The session ID 200 and UIDL 205 fields for a first entry in the database 39 are populated with the session ID and the UIDL for the first message. In response to populating the data fields with the UIDL and the session ID, an "on server" flag is set to a true state "T" in the message entry for the first message.

The "on server" flag exists in three states—a true state, a false state, and an unknown state. The true state serves as an indicator that the message associated with the message entry is located on the server. The false state serves as an indicator that the message associated with the message entry is not located on the server. The unknown state is indicative of the beginning of a client-server session or initialization of the message manager program module 37 (FIG. 3). Specifically, in the unknown state, all "on server" flags for message entries in the database are cleared prior to the start of download operations. In an exemplary embodiment, the message manager program module 37 (FIG. 3) changes all "on server" flags to unknown states when the message manager program module 37 (FIG. 3) is initialized. Advantageously, performing this task before a connection is made between the client and server eliminates unnecessary consumption of time during a client-server session. Hoverer, it will be appreciated by one skilled in the art that the message manager program module can change an "on server" flag for a message entry to an unknown state after a connection is made between a client and server.

After the "on server" flag is set to a true state, the client 20 retrieves the session ID and UIDL for a second message on the server 49. In this example, the session ID is "2" and the UIDL for the second message is "efgh". Again, the data fields 200 and 205 for a second entry are populated with the appropriate data, and an "on server" flag is set to a true state "T" in the database for this second message. If there are more messages on the server, this process is repeated for the additional messages to complete the initial download operation.

Once the session ID and UIDL have been populated in the database 39 for each message, the client 20 checks for a size restriction in connection with downloading messages from the server 49. A size restriction for downloading messages from the server can be set at any time based on user-preference. For example, it may be desirable to set a maximum size limit for downloading a message when a user has only a small amount of time to check messages. Consequently, the user may prefer to view messages of a certain size at another time. In a scenario where a size restriction is set for downloading messages, the client 20 transmits a LIST command to retrieve a list of message sizes, and only those messages that fall within the maximum size limit set by the user are downloaded into the message store 38. The process of downloading a message into the message store in connection with setting a size restriction is described in more detail below in connection with FIGS. 5–7.

In this example, the client 20 does not find a size restriction set by the user. Consequently, the client 20 transmits a RETR command to the server 49. The RETR command is a request to retrieve a message from the server into a local message store 38 located at the client 20. Each message is then downloaded into the local message store 38.

Turning to FIG. 4b, in response to each downloaded message, additional data fields 210, 215, 220, 230, 240, 245, and 250 in the database entries are populated with message-related information associated with the message. Specifically, a message size for the message is populated in the message size field 210, an entry identifier is populated in the EID field 215, and a receive date and time for the message is populated in the receive date and time field. In addition, with respect to multiple part messages, a message group identifier is populated in the message group ID field 240, a message parts number is populated in the message parts number field 245, and a total parts number is populated in the total pa its field 250. In this example, the message-related information for a message entry associated with the first message includes: message size "100", entry identifier "1", time and date "12/1/97 12:00:00". The message-related information associated with the second message includes: message size "50", entry identifier "2", time and date "12/1/97 12:01:00". In response to downloading the messages to the local message store 38, a "Download" flag is set in the database 39 for each downloaded message in the "download" flag field 230. This flag simply indicates that the message has been downloaded from the server 49 to the client 20. Consequently, the database 39 contains two message entries associated with the downloaded messages.

Before disconnecting the communication between the client 20 and server 49, a "delete" flag can be set for a message entry of the database 39 in response to the user dragging a representation of the corresponding message to a trash can presented via the GUI. In addition, a "delete" flag is automatically set for each message entry when the client is in a default mode, where a message is deleted from the server after it has been downloaded. The user also can set a time-based parameter in the message manager program module 37 that defines a time period for expiring all messages maintained in the local message store 38 after a pre-defined time period. Because the database 39 maintains local time entries for each message, those messages satisfying the pre-defined time period for expiration can be marked with a "delete" flag. In this example, the user has set a seventy-two hour time period for expiration of a message and its associated message entry.

Message entries containing "delete" flags in the database 39 can be deleted from the server 49 after all message retrieval operations are completed. In particular, all message entries marked with a "delete" flag are located in response to walking the message entries in the database 39 and thereafter, are deleted from the server 49. These message entries are not identified until all message retrieval operations are completed during this connection. In this example, there are no entries to be deleted during this connection. The client 20 is then disconnected from the server 49.

Referring to FIG. 4c, before the next download operation occurs, the session IDs in the session ID field 200 of the database 39 are cleared because this information is based on the last client-server session and is no longer useful. In addition, each "on server" flag in the "on server" flag field 225 is changed from a true state "T" to an unknown state "U" for each message entry.

Turning to FIG. 4d, in a subsequent download operation, the client 20 and server 49 are again connected, as described above in FIG. 4a. There are now five messages in the local store 115 located on the server 49, three of which are new messages that have not been previously downloaded to the client 20.

The client 20 transmits a UIDL command to the server 49. In response to the UIDL command, the client 20 retrieves from the server a session ID and the requested UIDL for the first message on the server. Once the client retrieves the UIDL from the server 49, the UIDL is compared to each message entry in the database 39 to determine whether the UIDL retrieved from the server matches any of the UIDLs in the database 39. If there is a match, a session ID is appended to the message entry having the matching UIDL, and an "on server" flag is changed from an unknown state "U" to a true state "T" in the database as a part of the message entry. If the UIDL retrieved from the server does not match any of the UIDLs in the database, the data fields 200 and 205 for a new message entry in the database 39 are populated with the UIDL and the session ID, and an "on server" flag is set to a true state "T" in the database 39 as a part of the message entry. This step of comparing UIDLs from the server 49 with UIDLs in the database 39 is performed for each message on the server 49.

As shown in FIG. 4d, session IDs are appended for message entries having UIDLs "abcd" and "efgh" because the message entries were previously entered in the database 39 and the associated messages have already been downloaded as reflected in the "download" flag field 230. The three remaining message entries are new and contain only the session ID, the UIDL, and an "on server" flag in a true state "T".

Specifically. session ID "3" has a UIDL of "ijkl", session ID "4" has a UIDL of "mnop", and session ID "5" has a UIDL of "qrst".

Once the respective session ID and UIDL have been populated for the new messages and the session ID has been appended to previously entered message entries in the database 39, the client 20 checks for a size restriction in connection with downloading messages from the server 49. In this example, the client 20 does not find a size restriction. As a result, the client 20 transmits a RETR command to the server 49. Each new message is then downloaded into the local message store 38. In other words, only the messages that have associated message entries with a cleared "download" flag are downloaded into the local message stole 38. In FIG. 4d, messages having UIDLs "ijkl", "mnop", and "qrst" are downloaded.

Turning to FIG. 4e, in response to each downloaded message, a message size for the message is populated in the message size field 210, an entry identifier is populated in the EID field 215, and a receive date and time for the message is populated in the receive date and time field. Specifically, UIDL "ijkl" has a message size of 150, an EID of 3, a date and time of "12/4/97 13:00:00; UIDL "mnop" has a message size of 300, an EID of 4, a date and time of "12/4/97 13:01:00; and UIDL "qrst" has a message size of 250, an EID of 5, a date and time of "12/4/97 13:02:00. In addition, with respect to multiple part messages, a message group identifier is populated in the message group ID field 240, a message parts number is populated in the message parts number field 245, and a total parts number is populated in the total parts field 250. In FIG. 4e, message entries having UIDLs "ijkl" and "mnop" are associated with a message having multiple message parts, as indicated by the message group identifier, the message parts number, and the total parts number in the data fields 240, 245, and 250, respectively. In particular, message entries having UIDLs "ijkl" and "mnop" have a common message group identifier of "zcy" and are labeled with message part numbers "1" and "2", respectively, of total parts number "2". When presenting the message associated with message entries having UIDLs "ijkl" and "mnop", message re-assembly is required. Message reassembly occurs preferably after the client-server session is completed. Message re-assembly will be described in greater detail below in connection with FIG. 8.

In response to downloading the new messages to the local message store 38, a "download" flag is set in a message entry of the database 39 for each downloaded message in the "download" flag field 230. Consequently, the database 39 now contains five message entries associated with the previously and newly downloaded messages.

Before disconnecting the communication between the client 20 and server 49, a "delete" flag is set for all message entries that have expired based on the period of time set by the user. As previously mentioned, the user set a time period of seventy-two hours. This determination is made by comparing the date and time located in the date and time field for each message entry to the preset period of time. If the preset period of time has expired for a message entry, the message entry is then marked for deletion. In FIG. 4e, none of the message entries has expired. Therefore, a delete flag is not set for any of the message entries. In FIG. 4e, the user has also set for deletion the second message entry having UIDL "efgh". As a result, a "delete" flag is set in the "delete" flag field 235 for the corresponding entry in the database 39. Next, the client 20 transmits a DELETE command to the server 49 to remove all messages from the server 49 and associated message entries in the database having a "delete" flag. In FIG. 4f, the message entry having UIDL "efgh" is removed from the database 39 and the associated message is removed from the server 49. Also, before disconnecting the client 20 from the server 49, the user may decide to delete the message having UIDL "qrst" from the server. The client 20 is then disconnected from the server 49.

Referring to FIG. 4g, before the next client-server connection is established, each session ID in the session ID field 200 is cleared and each "on server" flag in the "on server" flag field 225 is set to an unknown state "U" for each message entry.

Now turning to FIG. 4h, in a subsequent download and delete operation, the client 20 and server 49 are again connected. There are now four messages in the local store 115 located on the server 49, one of which is a new message that have not been previously downloaded to the client 20.

The client 20 transmits a UIDL command to the server 49. In response to the UIDL command, the client 20 retrieves from the server a session ID and the requested UIDL for the each message on the server. Once the client retrieves the UIDL from the server 49, the UIDL is compared to each UIDL in the database 39 as previously described in connection with FIG. 4d. If there is a match, a session ID is appended to the message entry having the matching UIDL, and an "on server" flag is set to a true state "T" in the database as a part of the message entry. As shown in FIG. 4h, session IDs are appended for message entries having UIDLs "abcd", "ijkl", and "mnop". As previously mentioned, the message associated with the message entry having UIDL "qrst" is no longer on the server. Therefore, a session ID is not entered for a corresponding message entry in the database 39, and the "on server" flag is changed from an unknown state "U" to a false state "F".

It the UIDL retrieved from the server does not match any of the UIDLs in the database, the data fields 200 and 205 in the database 39 are populated with the UIDL and the session ID for each message, and an "on server" flag is set to a true state "T" in the database 39 as a part of the message entry. As shown in FIG. 4h, there is only one new message having UIDL "uvwx" and session ID "4".

Once the respective session ID and UIDL have been populated for the new messages and the session ID has been appended to previously entered message entries in the database 39, the client 20 checks for a size restriction in connection with downloading messages from the server 49. In this example, the client 20 does not find a size restriction. As a result, the client 20 transmits a RETR command to the server 49. The new message is then downloaded into the local message store 38. In FIG. 4h, the message having UIDL "uvwx" is downloaded.

Turning to FIG. 4i, in response to the downloaded message, a message size of "180" for the message is populated in the message size field 210, all entry identifier of "6" is populated in the EID field 215, and a receive (late and time of "12/5/97 08:00:00" for the message is populated in the receive date and time field. There is no message group identifier, message parts number, or total parts number for the downloaded message.

In response to downloading the new message to the local message store 38, a "download" flag is set in the database 39 for the downloaded message in the "download" flag field 230. Consequently, the database 39 now contains five message entries associated with the previously and newly downloaded messages.

Before disconnecting the communication between the client 20 and server 49, a "delete" flag is set for all message entries that have expired based on the period of time set by the user. As previously mentioned, this determination is made by comparing the date and time located in the date and time field for each message entry to the preset period of time. If the preset period of time has expired for a message entry, the message entry is then marked for deletion. In this example, the message entry having UIDL "abcd" is marked for deletion as indicated in the "delete" flag field 235.

Next, the client 20 transmits a DELETE command to the server 49 to remove all messages from the server and associated message entries in the database having a "delete" flag. In FIG. 4j, the message entry having UIDL "abcd" is removed from the database 39 and the associated message is removed from the server 49.

Once all message entries having a "delete" flag are removed from the database or if there are no message entries having a "delete" flag, the client 20 is disconnected from the server 49.

Referring to FIG. 4k, after the client 20 is disconnected from the server 49, each message entry having an "on server" flag in a false state "F" is deleted from the database 39 because the associated message is no longer located on the server. In this case, the message entry having UIDL "qrst" is removed from the database 39, as shown in FIG. 4k.

In summary, a typical communication between the client 20 and server 49 is supported by database operations conducted by a message manager program module 37 of the e-mail message program 36 running on the client 20. In response to message-related information transmitted by the server 49 (session ID and UIDL), the message manager program module 37 creates a message list by creating, message entries in the database 39 and fillling the session ID 200 and UIDL 205 fields for these entries. In response to the client 20 rieceiving a downloaded message, the message manager program module 37 populates selected fields of the message entry corresponding to the downloaded message. Advantageously, the message manager keeps track of the downloaded message and updates the database as the status of the message changes.

After retrieving all identified messages, but prior to terminating the communication operation the message manager program module 37 searches the database 39 for entries containing a "delete" flag. For each message entry having a "delete" flag, the message manager program module 37 instructs the e-mail message program 36 to send a DELETE command for messages on the server corresponding to the message entries having "delete" flags.

Advantageously, by also maintaining information in the database regarding message deletion, the message manager program module serves as an effective and efficient management mechanism for messages. Whereas in prior systems, separate routines are usually needed to handle download, deletion, time expiration, message size restriction, and reassembly operations, the present invention provides a single mechanism for managing all of these operations, namely the message manager program module.

It will be appreciated by those skilled in the art that FIG. 4 shows only a representative example of the present invention and does not in any way limit the present invention to that example. For instance, the present invention can combine commands such as UIDL and RETR such that each command is provided alternately for each message. Further, it will be appreciated that the present invention is not limited to the data fields presented in this example, but may also include various other data fields containing information associated with messages.

The present invention provides the benefit of maintaining the current status of messages on the server. Advantageously, messages that have already been downloaded from the server to the local message store are not downloaded again. In some prior systems, a message is generally downloaded twice if a connection between the client and server is accidentally discontinued during a download operation. These prior art systems typically do not keep track of the download process. However, the present invention provides the benefit of storing, in a client-based database, not only the message-related information for the message, but also the status of the message, for example whether the message has been downloaded, whether the message is present on the server, and so forth. Consequently, when a client-server session is abruptly discontinued and later re-established, the present invention is able to conveniently start at the point where it left off by consulting the client-based database. Therefore, the present invention is able to avoid downloading a message twice, thereby solving an efficiency problem prevalent in prior systems.

Figure 5C:
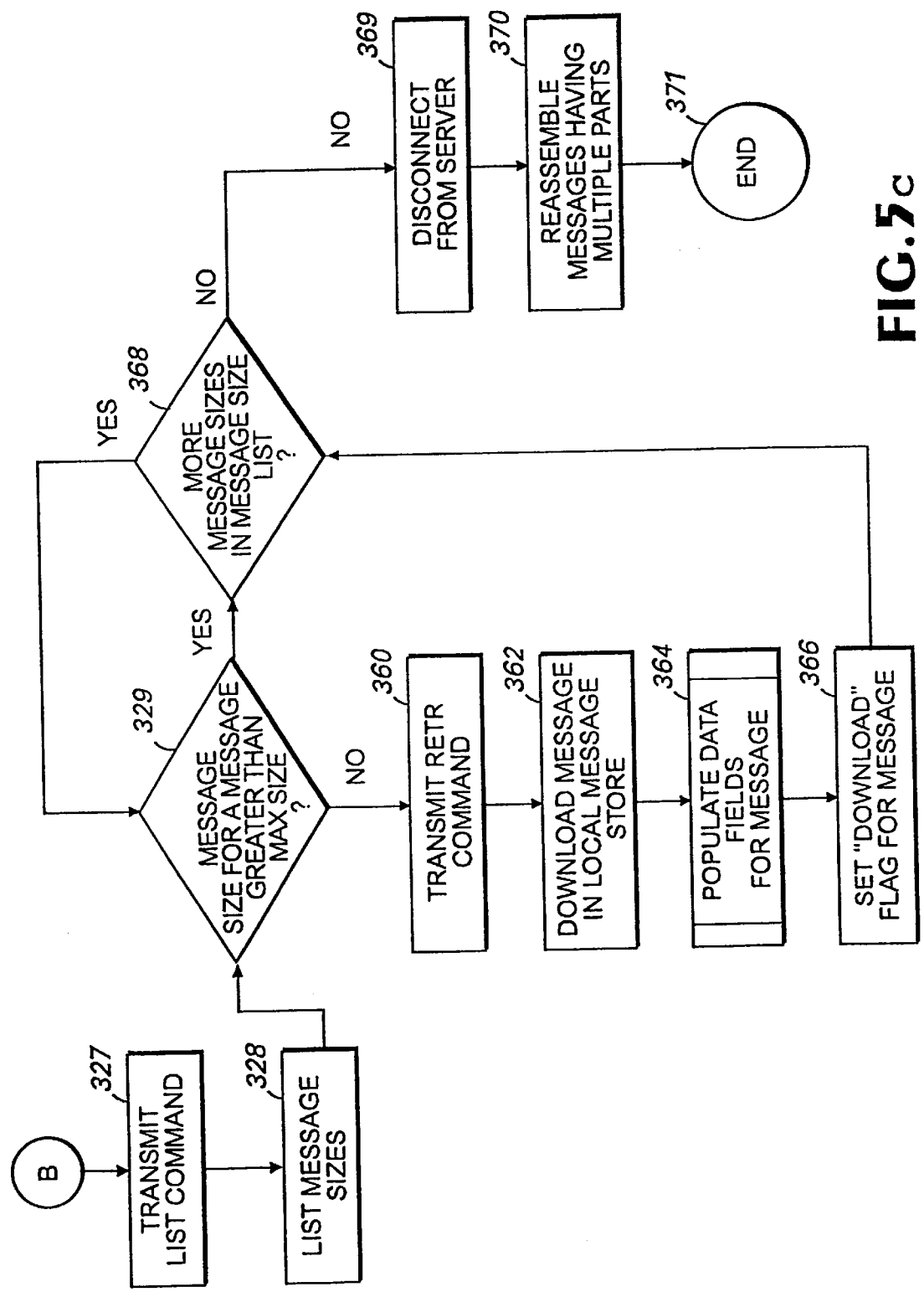

With continuing reference to FIGS. 1–4, FIGS. 5a–5c, collectively described as FIG. 5, are flow diagrams illustrating an exemplary process for an initial download operation utilizing a database in accordance with an exemplary embodiment of the present invention. Those skilled in the art will appreciate that the exemplary process is carried out by a client using an application program 36 (FIG. 2), such as the "MICROSOFT OUTLOOK '98" program. The "MICROSOFT OUTLOOK '98" program has a message manager program module 37 (FIG. 3), which is operative to communicate with the remote mail server 49 (FIG. 3). In this embodiment, the client, the remote mail server, and the local message store implement an Internet protocol and operate in an on-line mode. In addition, the remote mail server is in a "leave on server" mode.

At the START step 300, the exemplary program module is initialized and a connection is made between the client and the server, typically via a modem, for communication. Also, at START step 300, a log-in procedure typically occurs, where a user is prompted to enter a password, and the password is verified by the program module.

For an initial download operation, the client transmits a UIDL command to the server, in step 305. The UIDL command is a request for identification information associated with a message. Each message preferably has its own unique identifier or UIDL to identify the message.

In response to the UIDL command, in step 310. the client retrieves from the server a session ID, as well as the requested UIDL for a message on the server. The session ID or session identifier is indicative of the particular order in which the message is retrieved from the server during, a specific download operation. Next, in step 315, data fields in the client-based database are populated with the UIDL and the session ID. The population of data fields during specific steps in the process of FIG. 5 will be described in greater detail herein below in connection with FIGS. 6a and 6b.

In response to populating the data fields with the UIDL and the session ID, in step 320, an "on server" flag is set to a true state in the database for the message. In the true state, the "on server" flag serves as an indicator that the message associated with the message entry is located on the server.

A determination is then made, in step 325, as to whether there are ant additional messages located on the server. If there are additional messages located on the server, the "YES" branch is followed to step 310; otherwise, the "NO" branch is followed to step 326. In step 310, the client retrieves the session ID and UIDL for the next message from the server. Next, the data fields in the database are populated, in step 315, with the information retrieved from the server for this message, and, in step 320, an "on server" flag is set to the true state in the database for this message. This process is repeated for each successive message located on the server. A message entry list is effectively created in the database.

Turning briefly to FIG. 6a, an exemplary process of populating data fields is shown, where steps 405 and 410 represent the process of populating data fields as described in connection with step 315 of FIG. 5. In step 405, a session ID field is populated with the session ID retrieved in step 310 (FIG. 5a). Next, in step 410, a UIDL field is populated with the UIDL retrieved in step 310 (FIG. 5a).

Now, turning back to FIG. 5a, once the session ID and UIDL have been populated in a message entry for each message, a determination is made as to whether there is a size restriction set in connection with downloading messages from the server. If there is no size restriction set, the "NO" branch is followed to step 330 (FIG. 5b); otherwise, the "YES" branch is followed to step 327 (FIG. 5c).

In FIG. 5b, the client transmits a RETR command to the server, in step 330. The RETR command is a request to retrieve or download a message from the server into a local message store located at the client. Next, a first message associated with the first UIDL is downloaded from the server into the local message store, in step 335.

In response to the downloaded message, data fields are then populated, in step 340, in the database with specification information, such as message size and receive date and time, associated with the message. The population of specification information will be described in greater detail below in connection with FIG. 6b. Next, a "download" flag is set in the database for the downloaded message, in step 345. This flag simply indicates that the message has been downloaded.

Next, a determination is made, in step 350, as to whether there are any more messages to be downloaded to the client. This determination is based on the number of session ID and UIDL entries in the database that were obtained during steps 310 and 315. If there are more messages to be downloaded, the "YES" branch is followed to step 330, in which case a RETR command is sent to retrieve the next message. Step 330 through step 345 are repeated for the next message, and each message thereafter to complete the download process.

If there are no more messages to be downloaded, the "NO" branch is followed to step 369. In step 369, the client is disconnected from the server. In step 370, any messages having multiple parts are reassembled. The initial download process terminates at the END step 371.

Referring to FIG. 5c, if there is a size restriction set for downloading messages, the client transmits a LIST command, in step 327. The LIST command is a request to retrieve a list of all message sizes for the messages that may be downloaded from the server. The messages are then listed, in step 328.

Next, a determination is made, in step 329, as to whether the message size for a first message is greater than a maximum size limit set based on user-provided input. If so, the message is not downloaded and the "YES" branch is followed to step 368; otherwise, the "NO" branch is followed to step 360, in which case, a RETR command is transmitted to the server to download a message from the server into the local message store. Next, the message associated with the message size is downloaded from the server into the local message store, in step 362.

In response to the downloaded message, data fields are then populated, in step 364, in the database with specification information, such as message size and receive date and time, associated with the message. The population of specification information will be described in greater detail below in connection with FIG. 6b. Next, a "download" flag is set in the database for the downloaded message, in step 366.

Next, a determination is made, in step 368, as to whether there are any more message sizes in the messages size list. If there are more message sizes, the "YES" branch is followed to step 329. In step 329, a determination is made as to whether the message size for the next message is greater than the maximum size limit set. Step 360 through step 368 are repeated for the next message, and each message thereafter.

If there are no more message sizes in the message list, the "NO" branch is followed to step 369. In step 369, the client is disconnected from the server. In step 370, any messages having multiple parts are reassembled. The initial download process terminates at the END step 371.

Turning to FIG. 6b, an exemplary process of populating data fields is shown, where steps 420, 425, and 430 represent the process of populating data fields as described in connection with steps 340 and 364 of FIGS. 5b and 5c, respectively. Specifically, a message size for the message is populated in a message size field, in step 420. Next, an entry identifier is populated in an EID field, in step 425. Finally, a date and time is populated in a date and time field in step 430. It will be appreciated by those skilled in the art that the present invention is not limited to this particular order of populating data fields. Furthermore, it will be appreciated that the message size for a message can be populated in the message size field immediately after obtaining the list of message sizes (step 328, FIG. 5c) instead of populating the message size field with the message size at step 364 (FIG. 5c).

Figure 7A:
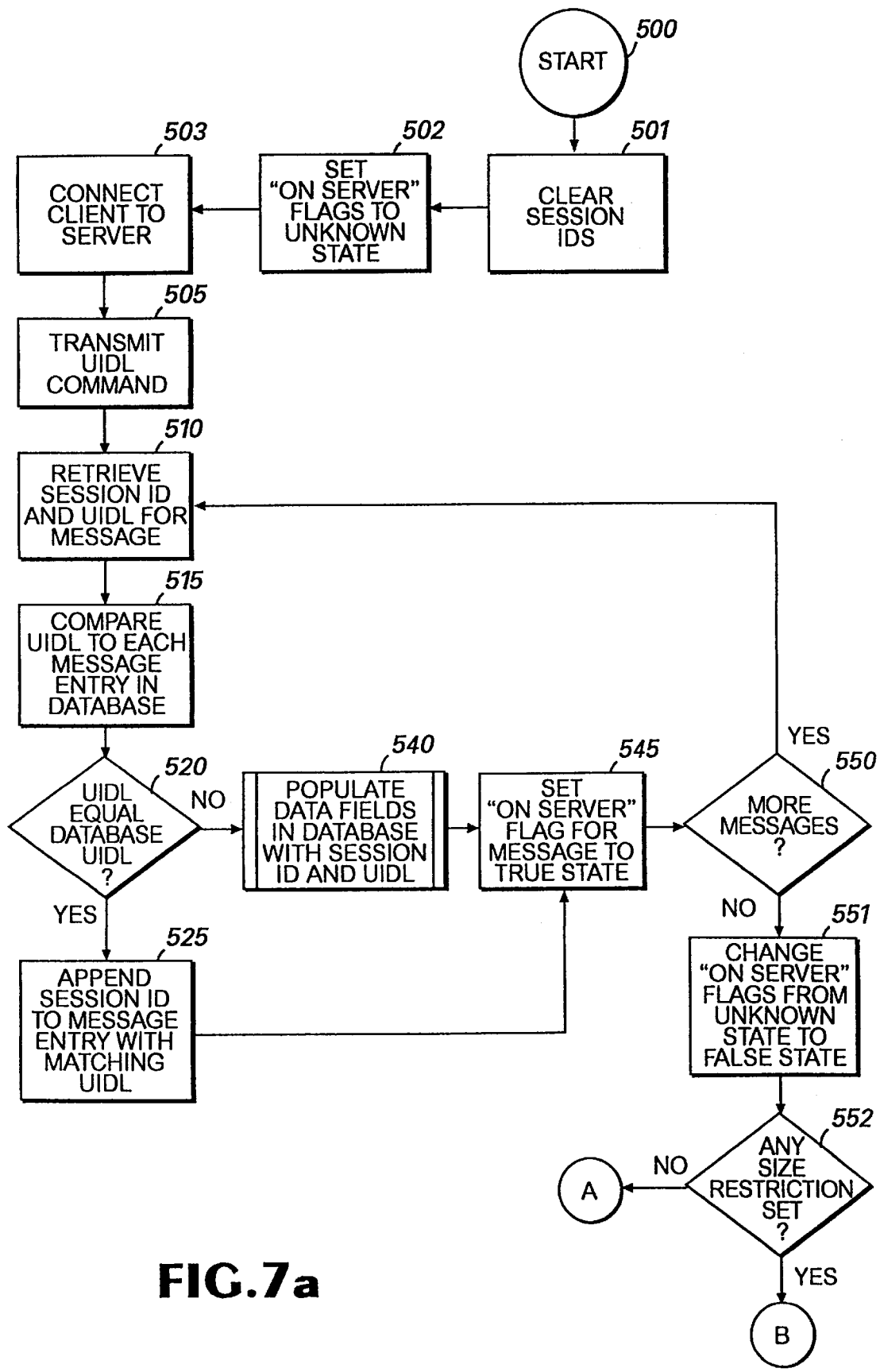
Figure 7D:
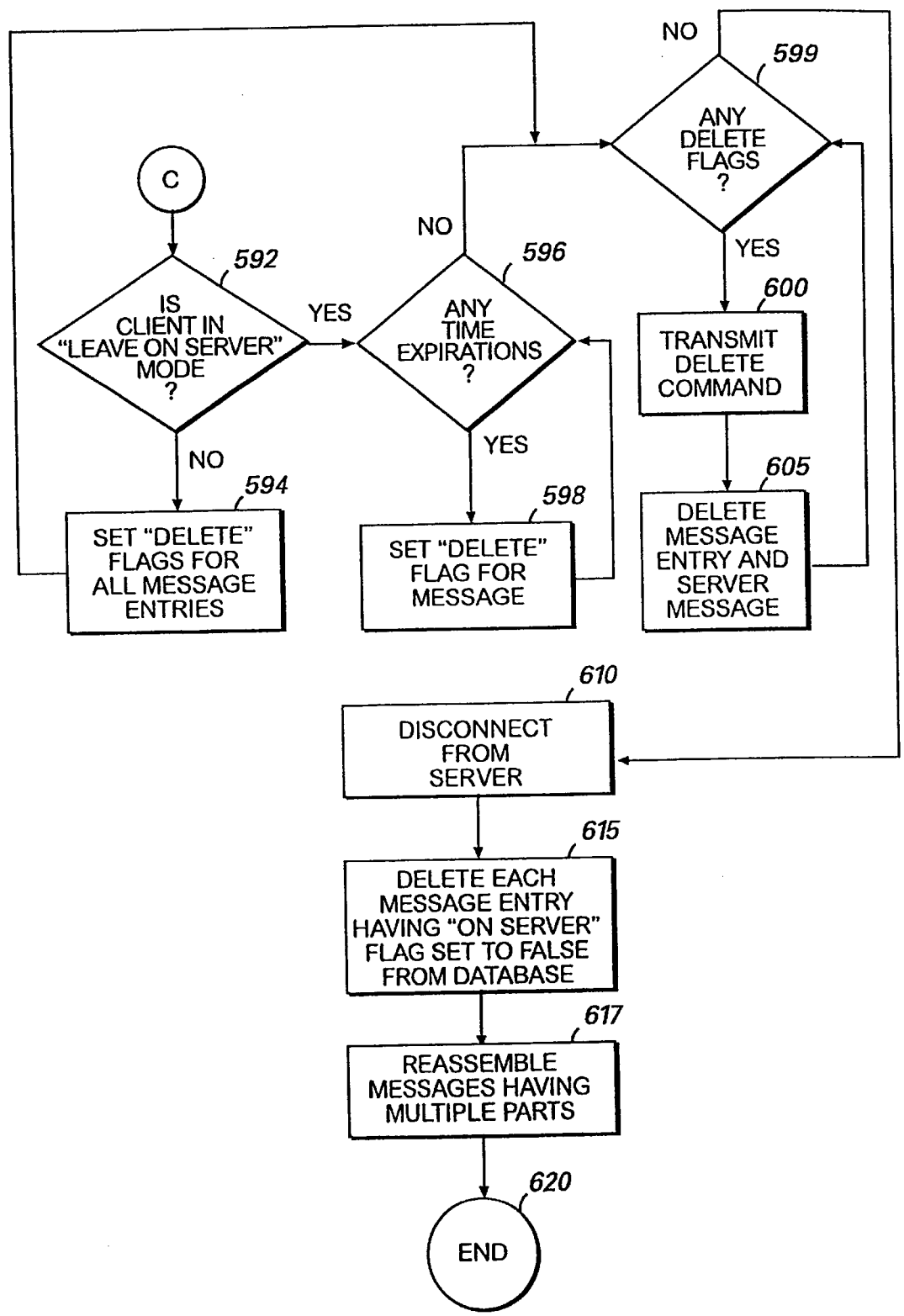

FIGS. 7a–7d, collectively described as FIG. 7, are flow diagrams illustrating an exemplary process of downloading and deleting information subsequent to an initial download operation in accordance with an exemplary embodiment of the present invention.

In FIG. 7a, at the START step 500, an exemplary program module is initialized, and in step 501, the client clears or zeroes all session IDs in the database because a new session is about to begin and this information is no longer needed. Next, all "on server" flags are set to an unknown state, in step 502.

In step 503, a connection is made between the client and the server for communication, and a log-in procedure typically occurs, where a user is prompted to enter a password, and the password is verified by the exemplary program module.

In step 505, the client transmits a UIDL command to the server. In response to the UIDL command, in step 510, the client retrieves front the server a session ID, as well as the requested UIDL for a message on the server.

Once the client retrieves the UIDL from the server, the UIDL is compared to each message entry in the database, in step 515. A central inquiry is made, in step 520, as to whether the UIDL retrieved from the server matches any of the UIDLs in the database. If there is a match, the "YES" branch is followed to step 525; otherwise, the "NO" branch is followed to step 540. In step 525, a session ID is appended to the message entry having the matching UIDL in the database. Next, in step 545, an "on server" flag, is set to a true state as a part of the message entry, which is associated with the message on the server. The true state indicates that the message associated with the message entry is on the server.

If the UIDL retrieved from the server does not match any of the UIDLs in the database, in step 540, the data fields in the database are populated with the UIDL and the session ID. In response to populating the data fields with the UIDL and the session ID. in step 545, an "on server" flag is set to a true state in the database as a part of the message entry, which is associated with the message on the server.

Next, a determination is made, in step 550, as to whether there are any additional messages located on the server. If there are additional messages located on the server, the "YES" branch is followed to step 510, where the client retrieves the session ID and UIDL for the next message from the server; otherwise, the "NO" branch is followed to step 551, in which case, the client changes all "on server" flags that are in unknown states to false states to indicate that these message entries do not have associated messages on the server.

Next, a determination is made as to whether there is a size restriction set in connection with downloading messages from the server. If there is no size restriction set, the "NO" branch is followed to step 555 (FIG. 7*b*); otherwise, the "YES" branch is followed to step 576 (FIG. 7*c*).

In FIG. 7*b*, the client transmits a RETR command to the server, in step 555, to download the message associated with the UIDL from the server into a local message store located at the client. Next, the message associated with the UIDL is downloaded from the server into the local message store, in step 560.

In response to the downloaded message, data fields are then populated, in step 565, in the database with the message size, the entry ID, and the receive date and time, all of which are associated with the message. Next, a "download" flag is set in the database for the downloaded message, in step 570, to indicate that the message has been downloaded.

A determination is then made, in step 575, as to whether there are any more messages to be downloaded onto the client. This determinatioin is based on the number of session ID and UIDL entries in the database that were populated during step 540. If there are more messages to be downloaded, the "YES" branch is followed to step 555, in which case a RETR command is sent to retrieve the next message. Step 560 through step 570 are repeated for the next message, and each message thereafter to complete the download process. If there are no more messages to be downloaded, the "NO" branch is followed to step 592 (FIG. 7*d*).

Turning to FIG. 7*c*, alternatively if there is a size restriction set for downloading messages, the client transmits a LIST command, in step 576. The messages are then listed, in step 578.

Next, a determination is made in step 580, as to as whether the message size for a first message is greater than a maximum size limit set based on user-provided input. If so, the message is not downloaded and the "YES" branch is followed to step 590; otherwise the "NO" branch is followed to step 582, in which case, a RETR command is transmitted to the server to download a message from the server into the local message store. Next, the message associated with the message size is downloaded from the server into the local message store, in step 584.

In response to the downloaded message, data fields are then populated, in step 586, in the database with specification information, such as message size and receive date and time, associated with the message. Next, a "download" flag is set in the database for the downloaded message, in step 588.

Next, a determination is made, in step 590, as to whether there are any more message sizes in the messages size list. If there are more message sizes, the "YES" branch is followed to step 580. In step 580, a determination is made as to whether the message size for the next message is greater than the maximum size limit set. Step 582 through step 590 are repeated for the next message, and each message thereafter. If there are no more message sizes in the message list, the "NO" branch is followed to step 592 (FIG. 7*d*).

Referring to FIG. 7*d*, a determination is then made, in step 592, as to whether the client is in a "leave on server" mode. If the client is in a "leave on server" mode, the "YES"branch is followed to step 596; otherwise, the "NO" branch is followed to step 594, in which case, "delete" flags are set for all message entries in the database.

Once it is determined that the client is in a "leave on server" mode, another determination is made, in step 596, as to whether a preset period of time has expired for any of the message entries. This determination is made by comparing the date and time located in the date and time field for each message entry to the preset period of time allowed for a message entry to remain in the database. If the preset period of time has expired for a message entry, the "YES" branch is followed to step 598, where a "delete" flag is set for the message entry; otherwise, the "NO" branch is followed to step 599. Step 598 is repeated for each message entry that has expired.

In step 599, a central inquiry is made as to whether there are any message entries in the database that have a "delete" flag. If there is a message entry having a "delete" flag, the "YES" branch is followed to step 600; otherwise, the "NO" branch is followed to step 610. In step 600, the client transmits a DELETE command to the server to remove the message from the server. Next, in step 605, the message is removed from the server, and the associated message entry is removed from the database. Steps 600 and 605 are repeated for each message entry having a "delete" flat.

In step 610, the client is disconnected from the server. After the client-server session has ended, in step 615, each message entry having an "on server" flag set to a false state is deleted from the database because a corresponding message is no longer located on the server. Next, in step 617, any messages having multiple parts are reassembled. The process terminates at the FND step 620.

In summary, for each subsequent download session, the session ID fields in the database are zeroed or otherwise cleared, all "on server" flaps are set to an unknown state for each message entry in the database, and a UIDL command is transmitted by the client to the server. In response to the UIDL command, the server transmits to the client session ID and UIDL information for each message on the server. The UIDL information comprises a list of messages available on the server for downloading to the client. The database is checked to determine whether the messages on the server, as identified by corresponding UIDLs, have been previously retrieved by the client in a prior download operation.

In the event that the UIDL obtained in response to the UIDL command is stored as an entry in the database, then the message has been previously downloaded to the local message store at the client. Consequently, the session ID is appended to the message entry corresponding to this UIDL, and the "on server" flag, which was initially set to an unknown state, is now set to a true state. Because the "download" flag for this message entry was previously set, the message identified by this UIDL is not retrieved—that is, the RETR command is not transmitted to the server for message entries having a " download"

On the other hand, if the UIDL is not present in the database, then the associated message is treated as a new message. A message entry for the message is then created in the database by populating the session ID and the UIDL fields and by setting the "on server" flag to a true state. If there is a size restriction set based on user-provided input, the client transmits a LIST command to the server to provide a list of the message sizes for messages on the server. Only the messages that fall within the size restriction are then downloaded from the server to a local message store located at the client. To download a message from the server to the client, the client transmits a RETR command to the server.

In response to each downloaded message, the message size, entry ID, received date/time data fields are populated, and the "download" flag is set. In this manner, only those messages on the server that represent new messages, i.e., messages not previously transmitted to the client, are retrieved for storage in the local message store.

An "on server" flag remaining in an unknown state for a message entry is changed to a false state during the download operation, and the message entry is later deleted from the database to avoid maintaining message-related information at the client for messages not available on the server. In addition, message entries having a "delete" flag and message entries that have remained in the database for a preset period of time are removed from the database. After completing the download operation, server-client communication is disconnected.

Advantageously, the present invention provides a database for maintaining archival message-related information for each message, which is identified by a UIDL and maintained on the server. The database then is used to manage messages maintained on the server. Moreover, the present invention provides several management features, including download, delete, time expiration, and message reassembly features, within a single program module, namely the message manager program module, as opposed to maintaining separate program modules program these features, as do prior systems.

MESSAGE REASSEMBLY

To assemble a message comprising multiple message parts, the present invention performs a search of selected fields in a central database, namely a message manager database, maintained at the client. These fields represent additions to the database described in connection with FIGS. 4–7. These fields include (1) message group ID, (2) message part number and (3) total parts fields. The values of these fields are placed in any MIME-compatible message. The database is searched to locate all message entries having the same value for the message group ID, which serves as a unique identifier for the message. The messages in the local message store are selected in response to the located message entries in the database and organized in proper message order based on the values of the message part number. The total parts value places a maximum limit on the number of message parts needed to complete the multi-part message. Accordingly, the message parts are assembled to form a single, reassembled message, which is then presented to the user. In an exemplary embodiment, message entries for messages containing multiple message parts are not typically removed from the database until the message his been reassembled or unless a predefined time period for the message entries to remain in the database has expired.

Figure 8:
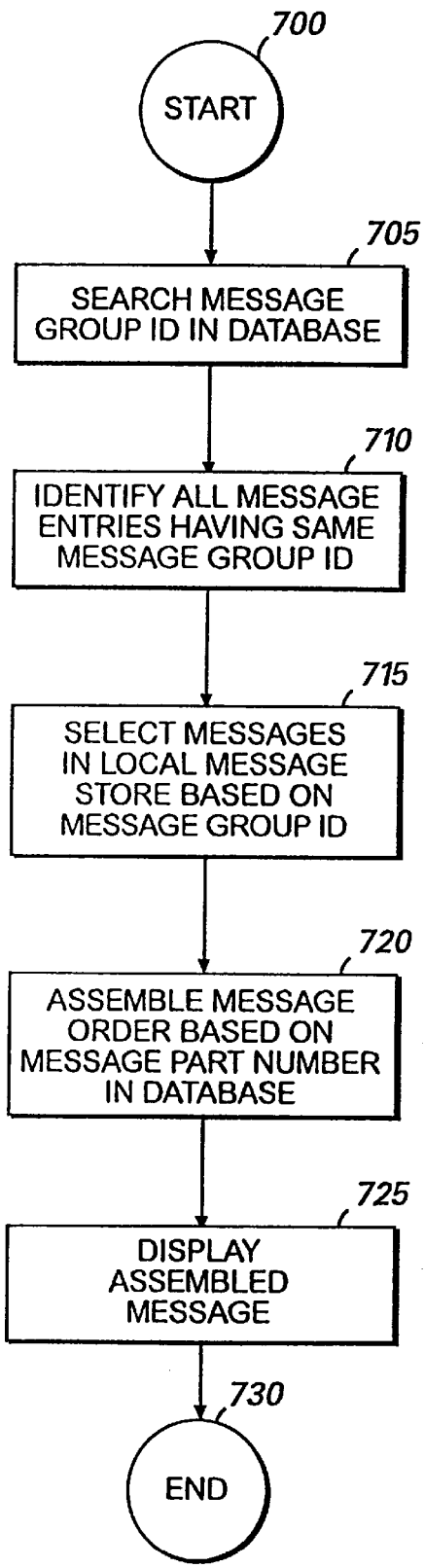
FIG. 8 is a flow diagram illustrating an exemplary process of reassembling a message having multiple parts in accordance with an exemplary embodiment of the present invention.

Turn now to FIG. 8, which is a flow diagram illustrating an exemplary process for reassembling a message having multiple message parts in accordance with an exemplary embodiment of the present invention. The process begins at the START step 700 by turning on the client 20 and selecting an exemplary application program that supports a message manager program module for implementing the exemplary process. In addition, a connection is made between the client and the server to retrieve a message having multiple message parts.

In step 705, the client searches a message group ID field in the database for each message entry. Next, the client identifies all of the message entries having the same message group ID, in step 710. Once all of the message entries have been identified, in step 715, the client selects from a local message store each message part that corresponds to the identified message entries. In step 720, the message parts are assembled in numerical order based on a pre-assigned message part number associated with each message part. Next, the message parts are displayed as a single, reassembled message, in step 725. The process terminates at the END step 730.

The process of FIG. 8 may be illustrated by way of the following example with continuing reference to FIG. 4. In this example, the user desires to retrieve a message having multiple parts. Referring to FIG. 4i, the message entries having UIDLs "ijkl" and "mnop" are indicative of a message having multiple parts. As shown in FIG. 4i, the message group ID for these message entries is "zcy".

The message manager program module 37 searches the message group ID field 240 in the database 39 and identifies session IDs "2" and "3" as having the same message group ID "zcy". The exemplary program module 37 then selects from the local message store 38 located at the client 20 the message parts corresponding to the message group ID based on the total parts number. The message manager program module 37 then assembles the message parts in accordance with the number provided in the message parts number field 245 located in the database 39 to produce a single message. In this case, the messages corresponding to UIDLs "ijkl" and "mnop" are assembled in the order "ijklmnop" to from a single message.

Message reassembly occurs preferably after communication is disconnected between the client and the server. Reassembling a message at this time eliminates unnecessary consumption of time during a client-server session. Advantageously, accessing these data fields in a database on the client is a more efficient and timely operation than retrieving the necessary message assembly information from the local message stole.

The present invention provides a system for managing messages communicated within a client-server architecture such as a distributed computing environment represented by a client and a server. The present invention, namely a message manager program module, uses a database, stored at the client, to maintain a central archive of message-related information to support current and future message communication operations between the client and the server. Communications with a message server are facilitated by accessing a client-based database representing a central archive of message-related information. Archived information is accessed in the client-based database during typical message communications operations, such as message download and delete operations. The client-based database is also used to Support efficient management of messages having multiple message parts, i.e., message re-assembly.

The invention may conveniently be implemented in one or more program modules that are based upon and implement the features illustrated in FIGS. 3–8. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes. In addition, although the invention was described in the context of a e-mail client, mail server, and message store, that implement one of a variety of Internet protocols, those skilled in the art will appreciate that the invention is applicable to remote servers that include other types of data stores, message stores, and file stores, and in other operating environments.

Alternative embodiments will become apparent to those skilled in the art to which the present invention pertains without departing from its spirit and scope. Accordingly, the scope of the present invention is defined by the appended claims rather than the foregoing description.

What is claimed is:

1. In a distributed computer system including a server and a client, the client including a local message store and a client-based database, a method for managing electronic mail messages based on message-related information corresponding to each message stored in the client-based database, comprising the steps of:
   (A) during a client-server session, retrieving from the server the message-related information corresponding to a message;
   (B) based on the message-related information, determining whether the message has been downloaded from the server to the local message store located at the client;
   (C) in response to determining that the message has not been downloaded from the server to the local message store,
      i. downloading the message from the server to the local message store,
      ii. populating data fields in the client-based database with the message-related information,
      iii. providing an indication in the client-based database that the message is present on the server, and
      iv. providing an indication in the client-based database that the message has been downloaded from the server to the local message store;
   (D) repeating the steps (A) through (C) for each remaining message on the server; and
   (E) consulting the client-based database for managing the messages during subsequent client-server sessions.

2. The method of claim 1, wherein the step of downloading the message from the server to the local message store comprises:
   determining whether a size restriction has been set for downloading the message;
   in response to determining that a size restriction has been set for downloading the message, determining whether a message size for the message is greater than a predetermined size limit; and
   in response to determining that either 1) a size restriction has not been set for downloading the message or 2) the message size for the message is not greater than the predetermined size limit, downloading the message from the server to the local message store.

3. The method of claim 1, further comprising the step of:
   in response to determining that the message has been downloaded from the server to the local message store, identifying in the client-based database the message-related information corresponding to the message and providing an indication in the client-based database that the message is present on the server.

4. The method of claim 1, further comprising the steps of:
   determining whether the client is in a "leave on server" mode, the "leave on server" mode indicating that the message remains on the server after the message has been downloaded from the server to the local message store; and
   in response to determining that the client is not in the "leave on server" mode, providing an indication in the client-based database to delete the message and based on the provided indication, deleting the message-related information for the message from the client-based database and the message from the server.

5. The method of claim 4, further comprising the steps of:
   in response to determining that the client is in the "leave on server" mode, determining whether a time expiration has been set for deleting the message;
   in response to determining that a time expiration has been set for deleting the message,
      i. determining whether the time has expired for the message, and
      ii. in response to determining that the time has expired for the message, providing an indication in the client-based database to delete the message and based on the provided indication, deleting the message-related information for the message from the client-based database and the message from the server.

6. The method of claim 5, wherein the step of determining whether the time has expired for the message comprises comparing a date and time for the message to a preset period of time allowed for the message-related information to remain in the client-based database.

7. The method of claim 5, further comprising the steps of:
   in response to determining that a time expiration has not been set for deleting the message, determining whether an indication to delete the message has been provided in the client-based database; and
   in response to determining that an indication to delete the message has been provided in the client-based database, deleting the message-related information for the message from the client-based database and the message from the server.

8. The method of claim 5, wherein the step of providing an indication to delete the message comprises setting a "delete" flag in the client-based database.

9. The method of claim 1, wherein the message-related information comprises a unique identifier for identifying the message and a session identifier for indicating the order in which the message is downloaded from the server to the client.

10. The method of claim 9, wherein the message-related information further comprises a message size and a date and time.

11. The method of claim 9, wherein the data fields comprise a unique identification field for storing the unique identifier, a session identification field for storing the session identifier, a message size field for storing the message size, and a date and time field for storing the date and time.

12. The method of claim 11, wherein the step of populating the data fields in the client-based database with the message-related information further comprises the steps of:
   populating the unique identification field with the unique identifier;
   populating the session identification field with the session identifier;
   populating the message size field with the message size; and
   populating the date and time field with the date and time.

13. The method of claim 1, wherein the step of providing an indication in the client-based database that the message is present on the server comprises setting an "on server" flag to a true state in the client-based database.

14. The method of claim 13, further comprising the steps of:

clearing a session identifier before each subsequent client-server session; and changing the "on server" flag from the true state to an unknown state before each subsequent client-server session, the unknown state indicating that the state of the message being present on the server is unknown.

15. The method of claim 14, further comprising the steps of:

during each subsequent client-server session, changing the "on server" flag from the unknown state to a false state when the message associated with the message-related information is not present on the server;

providing an indication in the client-based database to delete the message; and based on the provided indication, deleting the message-related information for the message from the client-based database after each subsequent client-server session has discontinued.

16. The method of claim 1, wherein the step of providing an indication in the client-based database that the message has been downloaded comprises setting a "download" flag in the client-based database.

17. In a distributed computer system including a server and a client including a local message store and a client-based database, a method for removing from the client-based database message entries for electronic mail messages based on message-related information corresponding to each message stored in the client-based database, comprising the steps of:

(A) consulting the client-based database comprising at least one message entry containing message-related information corresponding to one of a selected message;

(B) determining whether the client is in a "leave on server" mode, the "leave on server" mode indicating that the selected message remains on the server after the selected message has been downloaded from the server to the local message store located at the client;

(C) in response to determining that the client is not in the "leave on server" mode, providing an indication in the corresponding message entry in the client-based database to remove the selected message;

(D) in response to determining that the client is in the "leave on server" mode, determining whether a time expiration has been set for removing the selected message;

(E) in response to determining that a time expiration has been set for removing the selected message,
 i. determining whether the time has expired for the selected message, and
 ii. in response to determining that the time has expired for the selected message, providing the indication in the corresponding message entry in the client-based database to remove the selected message; and (F) in response to providing the indication in the corresponding message entry to remove the selected message, removing the corresponding message entry for the selected message from the client-based database and the selected message from the server.

18. The method of claim 17, further comprising the step of:

(G) repeating steps (B) through (F) for each remaining message on the server.

19. The method of claim 17, wherein the step of determining whether the time has expired for the selected message comprises comparing a date and time for the selected message to a preset period of time allowed for the corresponding message entry to remain in the client-based database.

20. The method of claim 17, wherein the step of providing an indication to remove the selected message comprises setting a "delete" flag in the corresponding message entry in the client-based database.

21. The method of claim 17, wherein the time expiration is set based on user-provided input.

22. The method of claim 17, further comprising the steps of:

providing a user-prompted indication in the corresponding message entry in the client-based database to remove the selected message, where the user-prompted indication is not based on the time expiration or the server mode; and based on the user-prompted indication, removing the corresponding message entry from the client-based database and the selected message from the server.

23. The method of claim 17, further comprising the step of removing from the client-based database each message entry that does not have an associated message on the server.

24. In a distributed computer system including a server and a client including a local message store and a client-based database, a method for obtaining selected messages based on message-related information stored in the client-based database, comprising the steps of:

A) storing in the client-based database at least one message entry having a unique identifier, each message entry corresponding to one of the selected messages and containing message-related information for the message;

B) retrieving from the server:
 i. a session identifier corresponding to the selected message, the session identifier indicating the order in which the selected message is downloaded from the server to the local message store located at the client, and
 ii. a unique identifier corresponding to the message, the unique identifier identifying the message;

C) determining whether the unique identifier for the selected message matches the unique identifier of the corresponding message entry;

D) if the unique identifier for the selected message matches the unique identifier of the corresponding message entry, then:
 i. appending the session identifier for the selected message to the corresponding message entry, and
 ii. providing an indication in the client-based database that the selected message is present on the server, and E) if the unique identifier for the selected message does not match the unique identifier of the corresponding message entry, then:
 i. downloading the selected message from the server to the local message store,
 ii. storing the message-related information in the corresponding message entry, the message related information including:
  a) the session identifier for the selected message,
  b) the unique identifier for the selected message, c) a message size for the selected message, and
d) a date and time for the selected message,
   iii. providing an indication in the corresponding message entry that the selected message is present on the server, and
   iv. providing an indication in the corresponding message entry that the selected message has been downloaded from the server to the local message store.

25. The method of claim 24, further comprising the step of repeating the steps B) through E) for each remaining message on the server.

26. The method of claim 24, wherein the step of downloading the message from the server to the local message store comprises:
   determining whether a size restriction has been set for downloading the message;
   in response to determining that a size restriction has been set for downloading the message, determining whether a message size for the message is greater than a predetermined size limit; and
   in response to determining that either 1) a size restriction has not been set for downloading the message or 2) the message size for the message is not greater than the predetermined size limit, downloading the message from the server to the local message store.

27. The method of claim 24, wherein the steps D) ii. and E) iii. comprise setting an "on server" flag in the client-based database to indicate that the selected message is present on the server.

28. The method of claim 24, wherein the step E) iv. comprises setting a "download" flag in the client-based database to indicate that the selected message has been downloaded from the server to the local message store.

29. The method of claim 24, further comprising the step of setting a "delete" flag in the client-based database for the corresponding message entry if the time and date for the selected message has expired.

30. The method of claim 29, further comprising the step of removing the corresponding message entry from the client-based database and the selected message from the server if a "delete" flag for the corresponding message entry has been set in the client-based database.

31. A method for assembling a message at a client, the message having multiple message parts in a local message store located at the client, comprising the steps of:
  (A) in a client-based database, storing a corresponding message entry for each of the message parts of the message, each of the corresponding message entries including:
    i. a message group identifier for identifying the message parts for the message,
    ii. a message part number for identifying the order of each of the message parts for the message, and
    iii. a total parts number for indicating the number of message parts in the message;
  (B) identifying in the client-based database each message entry having the same message group identifier;
  (C) selecting from the local message store the message parts having the same message group identifier based on the identified message entries in the client-based database; and
  (D) assembling at the client the message parts in order based on the message part number for each of the corresponding message entries in the client-based database, the assembled parts forming the message.

32. The method of claim 31, wherein the step c) is further based on the total parts number for each of the corresponding message entries in the client-based database, whereby selection of the message parts from the local message store is limited to the total parts number.

33. In a client-server environment, a system for managing electronic mail during a client-server session, comprising:
  (A) a server comprising a message and associated message-related information, the associated message-related information including:
    i. a unique identifier for identifying the message,
    ii. a session identifier for indicating the order in which the message is downloaded from the server during the client-server session,
    iii. a message size, and
    iv. a date and time for the message; and
  (B) a client operative to retrieve the message and the associated message-related information from the server, the client comprising:
    i. a local message store operative to store the message retrieved by the client from the server, and
    ii. a database operative to store the associated message-related information retrieved by the client from the server,
    iii. the database comprising message entries having a plurality of data fields, including:
      a. a unique identification field for storing the unique identifier,
      b. a session identification field for storing the session identifier,
      c. a message size field for storing the message size, and
      d. a date and time field for storing the date and time, wherein the data fields of a selected one of the message entries are populated with the associated message-related information for the message downloaded from the server to the local message store.

34. The system of claim 33, wherein the client consults the database for managing messages on the server during subsequent client-server sessions.

35. The system of claim 34, wherein the client checks the unique identifier for the message in the subsequent client-server sessions to determine whether a subsequent message associated with the subsequent client-server sessions is to be downloaded from the server to the local message store.

36. The system of claim 33, wherein the message includes multiple message parts each message part having a corresponding message entry such that the database comprising the message entries having the plurality of data fields further includes:
  a message group field for storing a message group identifier for identifying the message parts for the message;
  a message part number field for storing a message part number for identifying the order of each of the message parts for the message; and
  a total parts field for storing a total parts number for indicating the number of message parts in the message.

37. The system of claim 33, wherein the database comprising the message entries having the plurality of data fields further includes:
  a "delete" flag field for setting a delete flag to mark the message for deletion from the server and associated message-related information for deletion from the database;
  an "on server" flag field for setting an "on server" flag to indicate that the message is present on the server; and
  a "download" flag field for setting a "download flag" to indicate that the message has been downloaded from the server to the local message store.

* * * * *